United States Patent
Tsubakihara

(10) Patent No.: US 10,802,702 B2
(45) Date of Patent: Oct. 13, 2020

(54) TOUCH-ACTIVATED SCALING OPERATION IN INFORMATION PROCESSING APPARATUS AND INFORMATION PROCESSING METHOD

(71) Applicant: CANON KABUSHIKI KAISHA, Tokyo (JP)

(72) Inventor: Kazuyuki Tsubakihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 15/419,028

(22) Filed: Jan. 30, 2017

(65) Prior Publication Data

US 2017/0228149 A1 Aug. 10, 2017

(30) Foreign Application Priority Data

Feb. 8, 2016 (JP) .................................. 2016-021699

(51) Int. Cl.
*G06F 3/0488* (2013.01)
*G06F 3/0484* (2013.01)

(52) U.S. Cl.
CPC ...... *G06F 3/04883* (2013.01); *G06F 3/04845* (2013.01); *G06F 2203/04803* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,870,090 A * | 2/1999 | Takai | G06F 3/04842 715/788 |
| 2006/0132456 A1* | 6/2006 | Anson | G06F 3/0488 345/173 |
| 2009/0315834 A1 | 12/2009 | Nurmi et al. | 345/173 |
| 2010/0123734 A1* | 5/2010 | Ozawa | G06F 3/0485 345/619 |

(Continued)

FOREIGN PATENT DOCUMENTS

| | | |
|---|---|---|
| CN | 102067070 | 5/2011 |
| CN | 102467262 | 5/2012 |

(Continued)

OTHER PUBLICATIONS

EP Search and Examination Report dated Jul. 13, 2017, received in counterpart GB 1701981.1 (8 pages).

(Continued)

*Primary Examiner* — James T Tsai
(74) *Attorney, Agent, or Firm* — Venable LLP

(57) ABSTRACT

An information processing apparatus according to the present invention includes: a memory; and a processor configured to cause the information processing apparatus to execute a process according to a program stored in the memory, the process including: performing control so that an image is displayed in a predetermined area of a display apparatus; detecting a touch operation on the display apparatus; acquiring pressure information of the detected touch operation; and executing a process according to the acquired pressure information, in a case where a position at which the touch operation is detected is within the predetermined area.

9 Claims, 13 Drawing Sheets

(56) References Cited

U.S. PATENT DOCUMENTS

| | | | |
|---|---|---|---|
| 2010/0245238 A1* | 9/2010 | Kumagai | G06F 3/0346 345/156 |
| 2011/0095983 A1* | 4/2011 | Lu | G06F 3/03543 345/166 |
| 2011/0187750 A1 | 8/2011 | Ko et al. | |
| 2011/0199312 A1* | 8/2011 | Okuta | G06F 3/0416 345/173 |
| 2012/0127206 A1* | 5/2012 | Thompson | G06F 3/038 345/661 |
| 2012/0147052 A1* | 6/2012 | Homma | G06F 3/044 345/660 |
| 2014/0098058 A1* | 4/2014 | Baharav | G06F 3/0421 345/174 |
| 2014/0237422 A1* | 8/2014 | Ohlsson | G06F 3/0416 715/800 |
| 2015/0160794 A1* | 6/2015 | Huang | G06F 3/0482 715/810 |
| 2015/0234543 A1* | 8/2015 | Lin | G06F 3/0481 715/783 |
| 2015/0268766 A1 | 9/2015 | Kim et al. | |

FOREIGN PATENT DOCUMENTS

| | | |
|---|---|---|
| CN | 103870111 | 6/2014 |
| CN | 105068731 | 11/2015 |
| CN | 105260103 | 1/2016 |
| EP | 1736856 A2 | 12/2006 |
| JP | H04-060715 | 2/1992 |
| JP | H10-154042 | 6/1998 |
| JP | 2009-009612 | 1/2009 |
| JP | 2015-088085 A | 5/2015 |
| JP | 2016-015181 | 1/2016 |
| KR | 10-2014-0089224 A | 7/2014 |
| WO | 2015/064490 | 5/2015 |

OTHER PUBLICATIONS

Office Action dated Dec. 16, 2019 in counterpart Chinese Application No. 201710067782.4, together with English translation thereof.
Office Action dated Oct. 29, 2019 in counterpart Japanese Application No. 2016-021699, together with English Translation thereof.

\* cited by examiner

TOUCH-ACTIVATED SCALING OPERATION IN INFORMATION PROCESSING APPARATUS AND INFORMATION PROCESSING METHOD

BACKGROUND OF THE INVENTION

Field of the Invention

The present invention relates to an information processing apparatus and an information processing method.

Description of the Related Art

In an image display apparatus, one or more windows of an arbitrary size are displayed on a screen and individual information is displayed in each window. A user can change the size of a window by performing a drag operation on an edge of the window using a pointing device such as a mouse. For example, a user can reduce and enlarge the width of a window by a drag operation of dragging a right end of a window in a leftward direction and a rightward direction, respectively. Moreover, a user can reduce and enlarge the height of a window by a drag operation of dragging a lower end of a window in an upward direction and a downward direction, respectively. Furthermore, a user can enlarge and reduce both the height and the width of a window by a drag operation of dragging a top-right corner of a window in an up-right direction and a down-left direction, respectively. Furthermore, a user can enlarge (zoom-in) and reduce (zoom-out) an image in a window by scrolling a mouse wheel while pressing on a specific key (a Ctrl key or the like) of a keyboard.

An image display apparatus capable of receiving a touch operation that a user performs by touching a screen is also known. In such an image display apparatus, a user can change the size of a window by performing a drag operation which is a touch operation of touching on a display position at an edge of the window and moving the touched position. Furthermore, a user can enlarge and reduce an image in a window by performing a pinch-in and pinch-out operation in a display area of the window, respectively. The pinch-in and pinch-out operation is a touch operation (a multi-touch operation) of touching on two points of a screen and moving at least one of the touched two points. The pinch-in and pinch-out operation includes a pinch-in operation and a pinch-out operation. The pinch-in operation is a touch operation of moving the touched two points close to each other. For example, the pinch-in operation is a touch operation of moving two fingers so as to pinch an area in the screen. The pinch-out operation is a touch operation of moving the touched two points away from each other. For example, the pinch-out operation is a touch operation of spreading two fingers on a screen.

However, in the conventional technique, the operability of a touch operation performed on a window is poor. For example, as described above, it is necessary to touch an edge of a window in a case where a user changes the size of the window. However, since the edge area of a window is small, it is difficult to accurately touch on a display position of the edge of the window and operation errors occur easily. It is particularly difficult to accurately touch on a display position of a corner of a window. Moreover, in a case where a user performs an operation using a mouse, the display (shape) of a mouse cursor is generally changed in response to creation of a state (a mouse-over state) in which the mouse cursor is superimposed on an edge of a window. In this way, the user can easily understand which process will be performed according to the user's operation on the mouse by checking the mouse cursor. However, in a case where a user performs a touch operation, it is not possible to create a state corresponding to the mouse-over state. Due to this, it is not possible to apply a technique of changing the display of a mouse cursor (a pointer) to a touch operation.

As a conventional technique, a technique of improving the operability of a touch operation of changing one of the height and the width of a window using a bezel of an image display apparatus has been proposed (see Japanese Patent Application Publication No. 2015-088085). However, in the technique disclosed in Japanese Patent Application Publication No. 2015-088085, it is not possible to improve the operability of a touch operation of changing both the height and the width of a window simultaneously.

SUMMARY OF THE INVENTION

The present invention provides a technique capable of improving the operability of a touch operation.

The present invention in its first aspect provides an information processing apparatus comprising:
a memory; and
a processor configured to cause the information processing apparatus to execute a process according to a program stored in the memory, the process including:
performing control so that an image is displayed in a predetermined area of a display apparatus;
detecting a touch operation on the display apparatus;
acquiring pressure information of the detected touch operation; and
executing a process according to the acquired pressure information, in a case where a position at which the touch operation is detected is within the predetermined area.

The present invention in its second aspect provides an information processing method comprising:
performing control so that an image is displayed in a predetermined area of a display apparatus;
detecting a touch operation on the display apparatus;
acquiring pressure information of the detected touch operation; and
executing a process according to the acquired pressure information, in a case where a position at which the touch operation is detected is within the predetermined area.

The present invention in its third aspect provides a non-transitory computer readable medium that stores a program, wherein
the program causes a computer to execute:
performing control so that an image is displayed in a predetermined area of a display apparatus;
detecting a touch operation on the display apparatus;
acquiring pressure information of the detected touch operation; and
executing a process according to the acquired pressure information, in a case where a position at which the touch operation is detected is within the predetermined area.

According to the present invention, it is possible to provide a technique capable of improving the operability of a touch operation.

Further features of the present invention will become apparent from the following description of exemplary embodiments with reference to the attached drawings.

DESCRIPTION OF THE EMBODIMENTS

Embodiment 1

Hereinafter, Embodiment 1 of the present invention will be described. In the following description, an example in which an information processing apparatus according to the present embodiment is provided in an image display apparatus is described. However, the information processing apparatus according to the present embodiment may be an apparatus which is separated from the image display apparatus. For example, a personal computer (PC) connectable to the image display apparatus may be used as the information processing apparatus according to the present embodiment. The image display apparatus according to the present embodiment includes a touch panel, and a user of the image display apparatus (the information processing apparatus) can input various instructions to the image display apparatus (the information processing apparatus) by performing an operation using the touch panel. An operation which uses a touch panel is an operation that a user performs by touching the screen of an image display apparatus with a finger or the like. Such an operation is referred to as a "touch operation". Moreover, a window system operates on the image display apparatus (the information processing apparatus) according to the present embodiment and a plurality of windows can be displayed on a screen.

Figure 1:
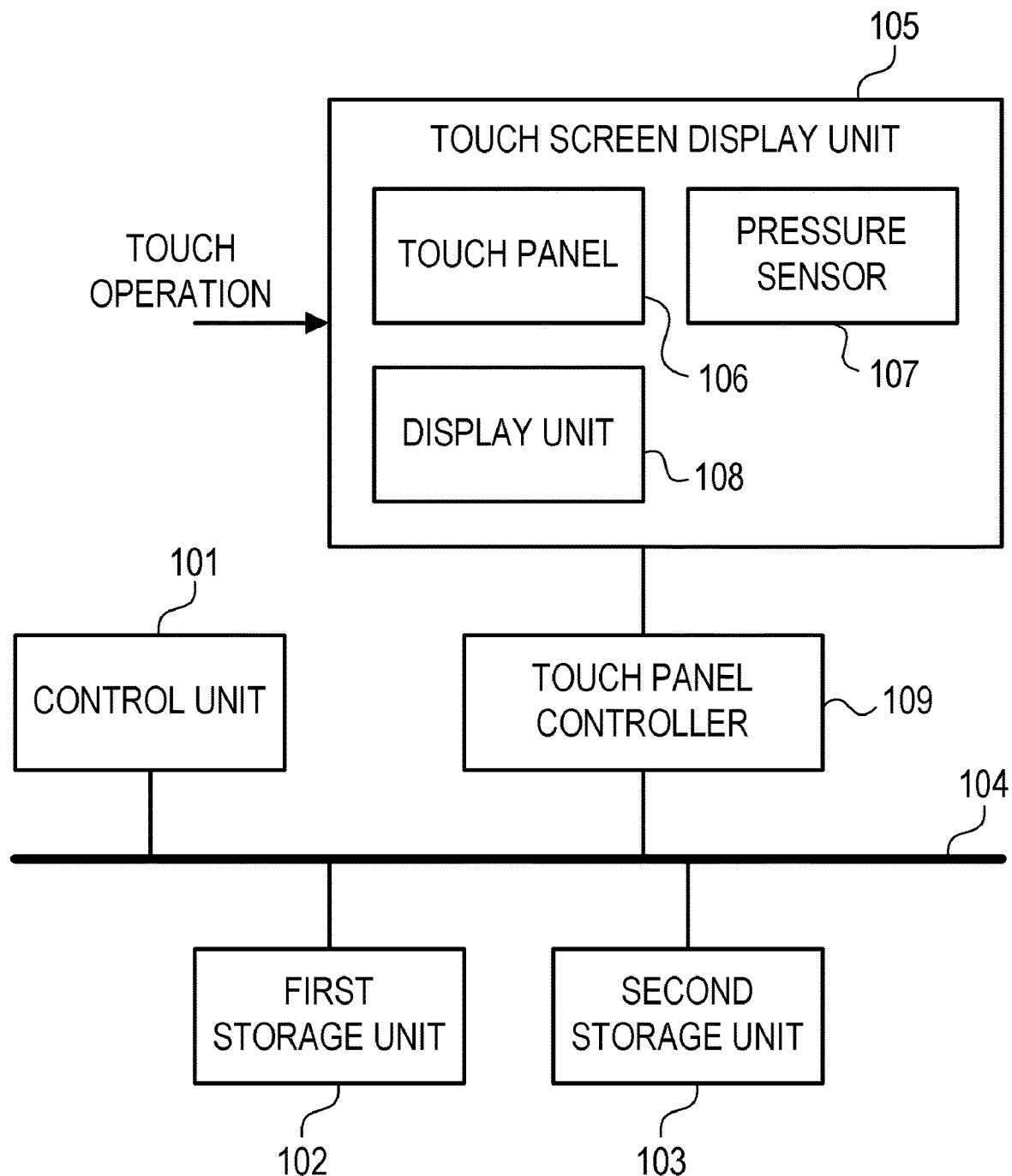
FIG. 1 is a block diagram illustrating a configuration example of an image display apparatus according to Embodiments 1 to 4.

FIG. 1 is a block diagram illustrating a configuration example of an image display apparatus according to the present embodiment. As illustrated in FIG. 1, the image display apparatus according to the present embodiment includes a control unit 101, a first storage unit 102, a second storage unit 103, a bus 104, a touch screen display unit 105, and a touch panel controller 109.

The control unit 101 controls respective processes of the image display apparatus. For example, the control unit 101 performs display control of displaying an image on the screen of the image display apparatus. Moreover, the control unit 101 performs an operation detection process of detecting a touch operation, a pressure detection process of detecting a touch pressure (the pressure of a touch in the touch operation), an enlarging and reducing process of enlarging and reducing a window displayed on the screen, an enlarging and reducing process of enlarging and reducing an image in the window, and other processes. The control unit 101 performs, for instance, an enlarging and reducing process of enlarging and reducing a window displayed on the screen and an enlarging and reducing process of enlarging and reducing an image in the window. A central processing unit (CPU), for example, can be used as the control unit 101. One hardware component may be used as the control unit 101 or a plurality of hardware components may be used as the control unit 101. The respective processes of the image display apparatus may be controlled by the plurality of hardware components executing the processes in a shared manner.

In the "window enlarging and reducing process," the size of a window is changed. Specifically, in the "window enlarging and reducing process" the window is enlarged and the window is reduced. Thus, in the following description, the "window enlarging and reducing process" will be referred to as a "window size changing process". In the "window image enlarging and reducing process," the size of an image in a window is changed. Specifically, in the "window image enlarging and reducing process," the image in a window is enlarged and the image in a window is reduced. Thus, in the following description, the "window image enlarging and reducing process" will be referred to as a "window image size changing process".

The first storage unit 102 is a storage unit that stores various items of data in a non-transitory manner. The first storage unit 102 stores a program executed by the control unit 101, various items of setting data, and the like, for example. A nonvolatile semiconductor memory, a magnetic disk, an optical disc, and the like can be used as the first storage unit 102. The data recorded on the first storage unit 102 is held in the first storage unit 102 even when the power of the image display apparatus is turned off. The first storage unit 102 may be a storage apparatus separated from the image display apparatus and the information processing apparatus.

The second storage unit 103 is a storage unit that temporarily stores various items of data. For example, the second storage unit 103 is used as a work memory of the control unit 101. Moreover, the second storage unit 103 is also used as a video memory that temporarily stores image data (video data, graphic data, or the like) to be displayed on the screen. A volatile and large-capacity semiconductor memory, for example, is used as the second storage unit 103.

The bus 104 is used for transmitting data between functional units of the image display apparatus. For example, transmission of commands from the control unit 101 to the respective functional units, transmission of data from the storage unit to the respective functional units, and the like are performed via the bus 104.

The touch screen display unit 105 displays an image on the screen according to the display control performed by the control unit 101. Moreover, the touch screen display unit 105 receives a touch operation, outputs information (signals) corresponding to the touch operation, and outputs information (signals) corresponding to a touch pressure. In the present embodiment, the touch screen display unit 105 includes a touch panel 106, a pressure sensor 107, and a display unit 108.

The touch panel 106 receives a touch operation and outputs operation information corresponding to the touch operation. The operation information indicates the touched position (the position in the screen), for example. Moreover, in the present embodiment, the touch panel 106 can receive a touch operation (multi-touch operation) of the user touching on a plurality of positions in the screen. In a case where a multi-touch operation is performed, the number of touched positions and information indicating the coordinates of the respective touched positions are output as the operation information, for example. The pressure sensor 107 detects a touch pressure and outputs pressure information (information indicating the touch pressure) corresponding to the touch pressure. The display unit 108 displays an image on the screen according to display control. Specifically, the display unit 108 displays an image based on the image data written to the second storage unit 103 by the display control on the screen. A liquid crystal display panel, an organic EL display panel, a plasma display panel, or the like, for example, is used as the display unit 108.

The touch panel controller 109 converts a data format of the operation information output from the touch panel 106 to a predetermined data format that the control unit 101 can recognize and outputs the operation information after conversion to the control unit 101. The control unit 101 detects a touch operation by analyzing the operation information output from the touch panel controller 109. The touch panel controller 109 converts the data format of the pressure information output from the pressure sensor 107 to a predetermined data format that the control unit 101 can recognize and outputs the pressure information after conversion to the control unit 101. The control unit 101 detects a touch pressure by analyzing the pressure information output from the touch panel controller 109. Moreover, the touch panel controller 109 controls transmission of image data from the second storage unit 103 to the display unit 108 according to an instruction (display control) from the control unit 101.

Figure 2A:
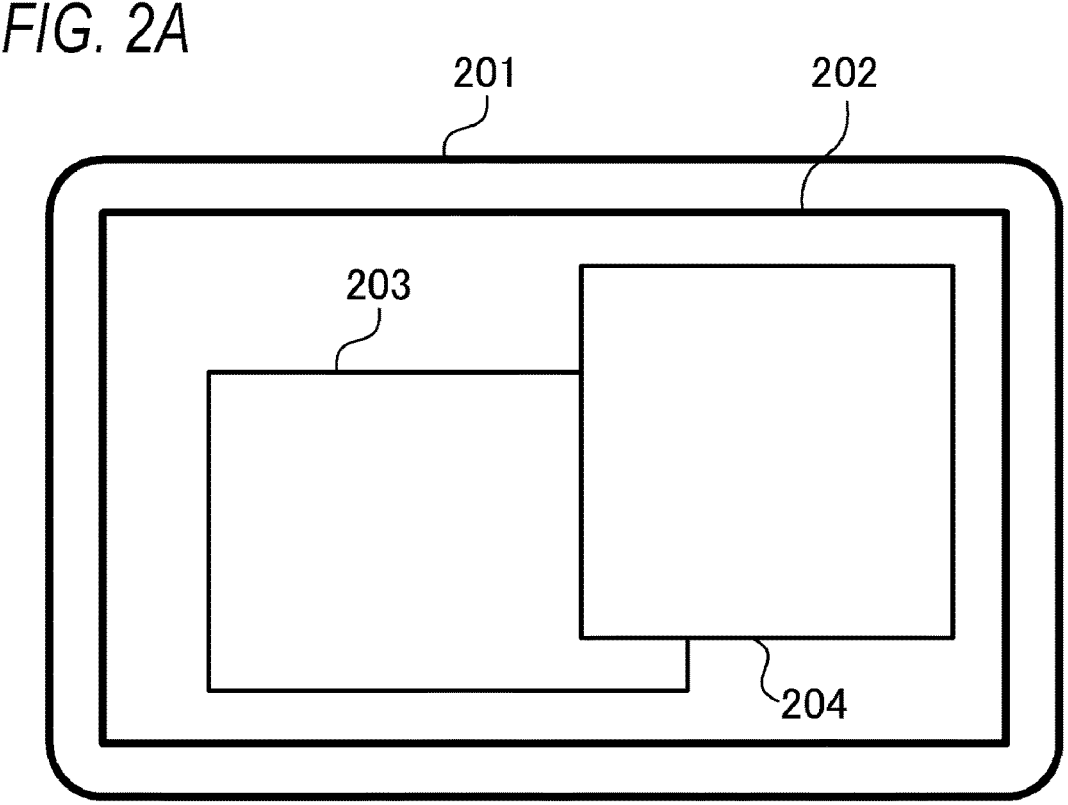
FIGS. 2A and 2B are schematic diagram of the image display apparatus according to Embodiments 1 to 4.
Figure 2B:
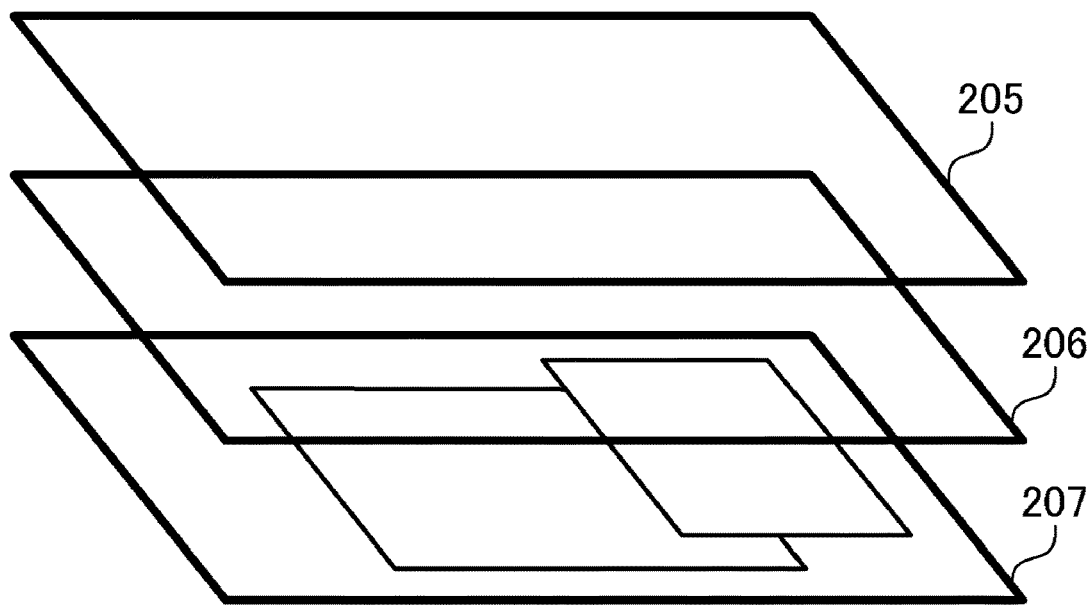

FIGS. 2A and 2B are schematic diagrams of the image display apparatus according to the present embodiment. FIG. 2A is an external view of the image display apparatus and FIG. 2B is an exploded view illustrating a physical configuration of the touch screen display unit 105. An image display apparatus 201 according to the present embodiment can display one or more windows on a screen (a display surface) 202. In the example of FIG. 2A, two windows 203 and 204 are displayed. In the present embodiment, as illustrated in FIG. 2B, a pressure sensor 206 (the pressure sensor 107 illustrated in FIG. 1) is disposed on a display unit 207 (the display unit 108 illustrated in FIG. 1). Moreover, a touch panel 205 (the touch panel 106 illustrated in FIG. 1) is disposed on the pressure sensor 206. In FIG. 2B, although the display unit 207, the pressure sensor 206, and the touch panel 205 are separated from each other, these components may be integrated with each other. Moreover, the order of the display unit 207, the pressure sensor 206, and the touch panel 205 are not particularly limited. For example, the pressure sensor 206 may be disposed on the touch panel 205.

In the present embodiment, in a case where the control unit 101 detects a pinch-in and pinch-out operation performed within a display area of a window as a touch operation, the control unit 101 selectively executes a window size changing process and a window image size changing process according to the touch pressure in the touch operation. In the following description, the pinch-in and pinch-out operation will be referred to as a "pinch operation". The pinch operation is a multi-touch operation of touching on two points of a screen and moving at least one of the touched two points. The pinch operation includes a pinch-in operation and a pinch-out operation. The pinch-in operation is a touch operation of moving the touched two points close to each other. For example, the pinch-in operation is a touch operation of moving two fingers so as to pinch an area in the screen. The pinch-out operation is a touch operation of moving the touched two points away from each other. For example, the pinch-out operation is a touch operation of spreading two fingers on a screen. In the present embodiment, a specific operation is described as a pinch operation, and a process corresponding thereto is described as an enlarging and reducing process. However, the present invention is not limited to this, but a touch operation of another type other than the pinch operation and a process other than the enlarging and reducing process can obtain the same effect that the target of a process is switched according to the magnitude of the touch pressure.

Figure 3A:
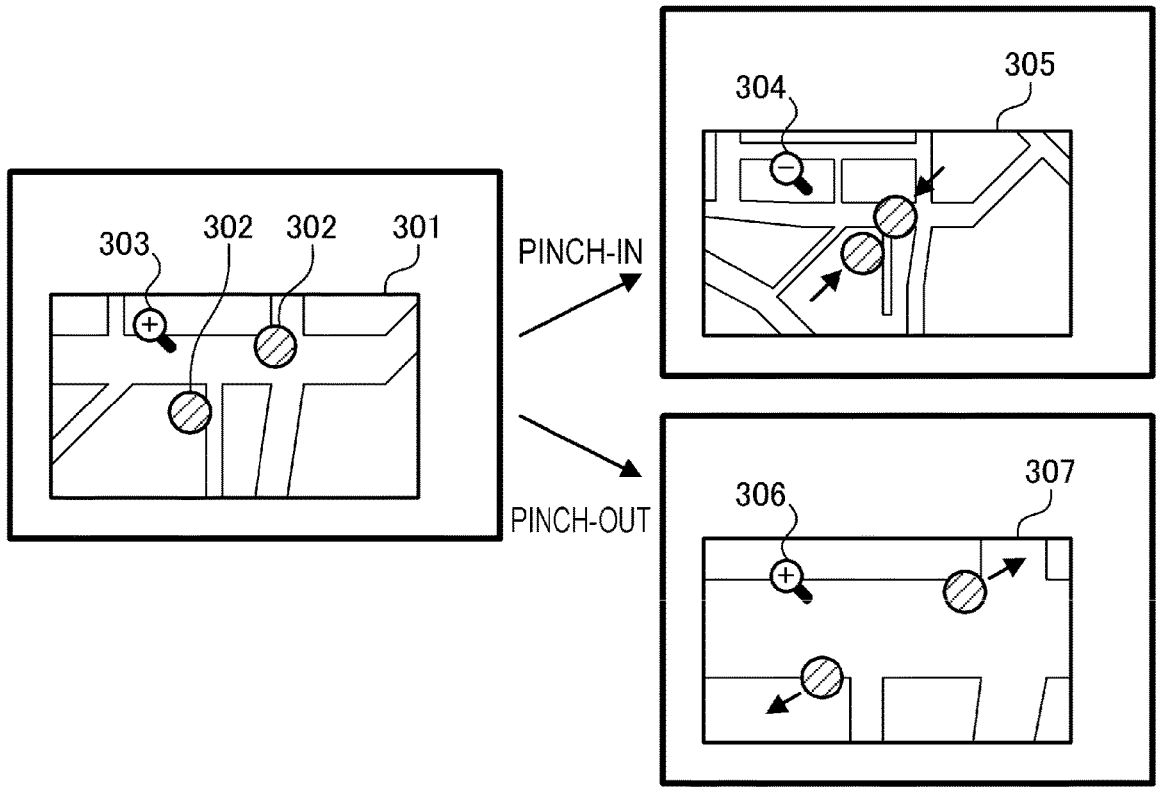
FIGS. 3A and 3B are diagrams illustrating a display change example according to Embodiment 1.

FIG. 3A illustrates a display change example in a case where a pinch operation with a weak touch pressure (a normal touch pressure) is performed within the window 301. In FIG. 3A, a pinch operation is performed using two fingers 302. In a case where a user touches on the inner side of the window 301 with the two fingers 302 with a weak touch pressure, the control unit 101 determines that it is instructed to execute a window image size changing process of changing the size of an image in the window 301. Moreover, the control unit 101 performs display control of displaying a notification pointer (a notification image) 303 indicating the window image size changing process on the screen. In a case where a pinch-in operation is performed in this state, the control unit 101 performs display control of displaying a notification pointer 304 indicating a window image reducing process (the window image size changing process of reducing an image in the window) on the screen. Specifically, the control unit 101 performs display control of changing the notification pointer 303 to the notification pointer 304. Furthermore, the control unit 101 performs a window image reducing process of reducing an image in the window 301. Symbol 305 indicates an image after the window image reducing process. On the other hand, in a case where a pinch-out operation is performed, the control unit 101 performs display control of displaying a notification pointer 306 indicating a window image enlarging process (the window image size changing process of enlarging an image in the window) on the screen. Specifically, the control unit 101 performs display control of maintaining the display of the notification pointer 303. Furthermore, the control unit 101 performs a window image enlarging process of enlarging the image in the window 301. Symbol 307 indicates an image after the window image enlarging process.

The window image size changing process depends on an image displayed in the window. For example, in a case where a map is displayed in the window, the window image size changing process changes the scale of the map so that the size of an area displayed within the same window size is changed. In a case where a still image or a video image is displayed in the window, the window image size changing process changes the image size of the still image or the video image. In a case where a list of a plurality of thumbnail images is displayed in the window, the window image size changing process changes the image size of each thumbnail image and changes the number of thumbnail images in the window.

In FIG. 3A, although the same notification pointer as the notification pointer 306 is used as the notification pointer 303, the notification pointer 303 is not limited to this. For example, the same notification pointer as the notification pointer 304 may be used as the notification pointer 303, or a notification pointer different from the notification pointers 304 and 306 may be used as the notification pointer 303.

Figure 3B:
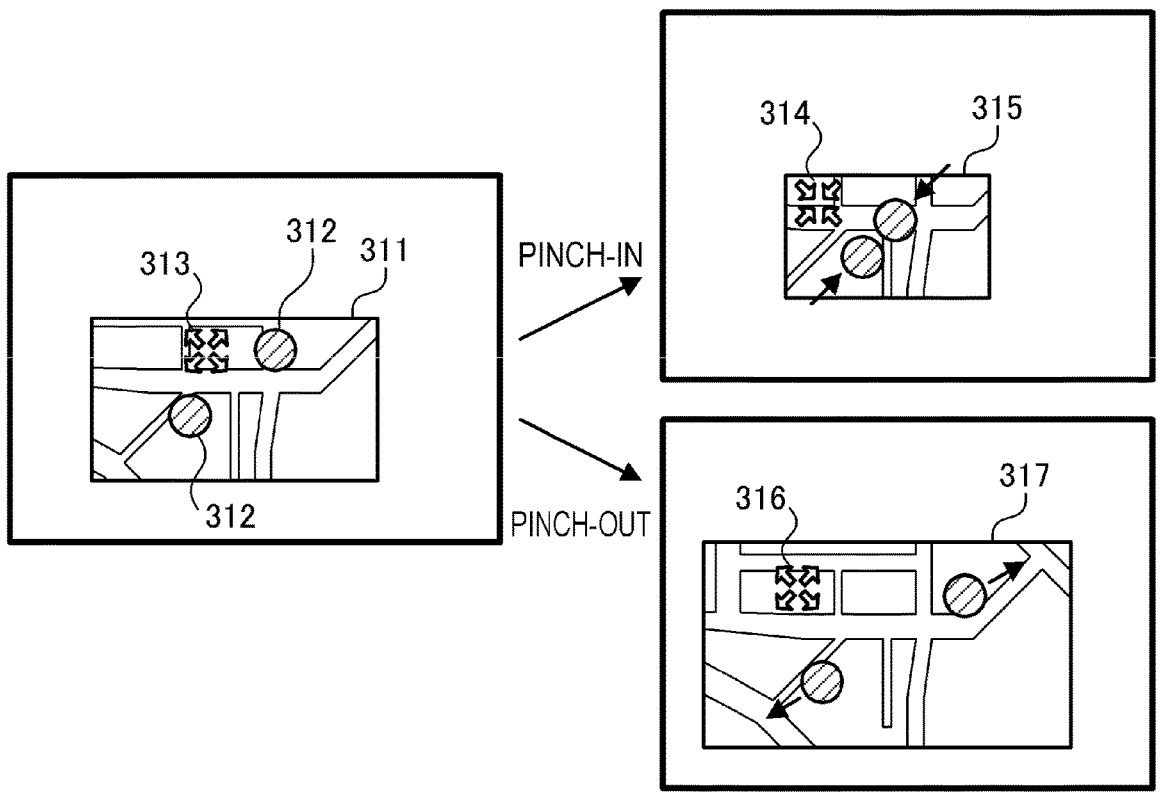

FIG. 3B illustrates a display change example in a case where a pinch operation with a strong touch pressure is performed within a window 311. In FIG. 3B, a pinch operation is performed using two fingers 312. In a case where a user touches on the inner side of the window 311 with the two fingers 312 with a strong touch pressure, the control unit 101 determines that it is instructed to execute a window size changing process of changing the size of the window 311. Moreover, the control unit 101 performs display control of displaying a notification pointer (a notification image) 313 indicating the window size changing process on the screen. In a case where a pinch-in operation is performed in this state, the control unit 101 performs display control of displaying on the screen a notification pointer 314 indicating a window reducing process (the window size changing process of reducing the window) on the screen. Specifically, the control unit 101 performs display control of changing the notification pointer 313 to the notification pointer 314. Furthermore, the control unit 101 performs a window reducing process of reducing the window 311. Symbol 315 indicates a window after the window reducing process. On the other hand, in a case where a pinch-out operation is performed, the control unit 101 performs display control of displaying a notification pointer 316 indicating a window enlarging process (the window size changing process of enlarging the window) on the screen. Specifically, the control unit 101 performs display control of maintaining the display of the notification pointer 313. Furthermore, the control unit 101 performs a window enlarging process of enlarging the window 311. Symbol 317 indicates a window after the window enlarging process.

In FIG. 3B, although the same notification pointer as the notification pointer 316 is used as the notification pointer 313, the notification pointer 313 is not limited to this. For example, the same notification pointer as the notification pointer 314 may be used as the notification pointer 313, or a notification pointer different from the notification pointers 314 and 316 may be used as the notification pointer 313. Moreover, the size of an image in the window may be changed or may not be changed according to a change in the size of the window by the window size changing process.

Figure 4A:
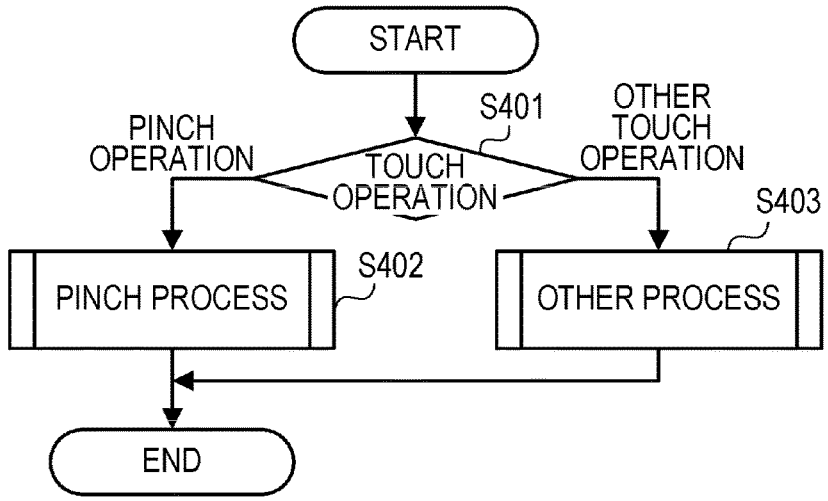
FIGS. 4A and 4B are flowcharts illustrating an example of a process flow of the image display apparatus according to Embodiment 1.
Figure 4B:
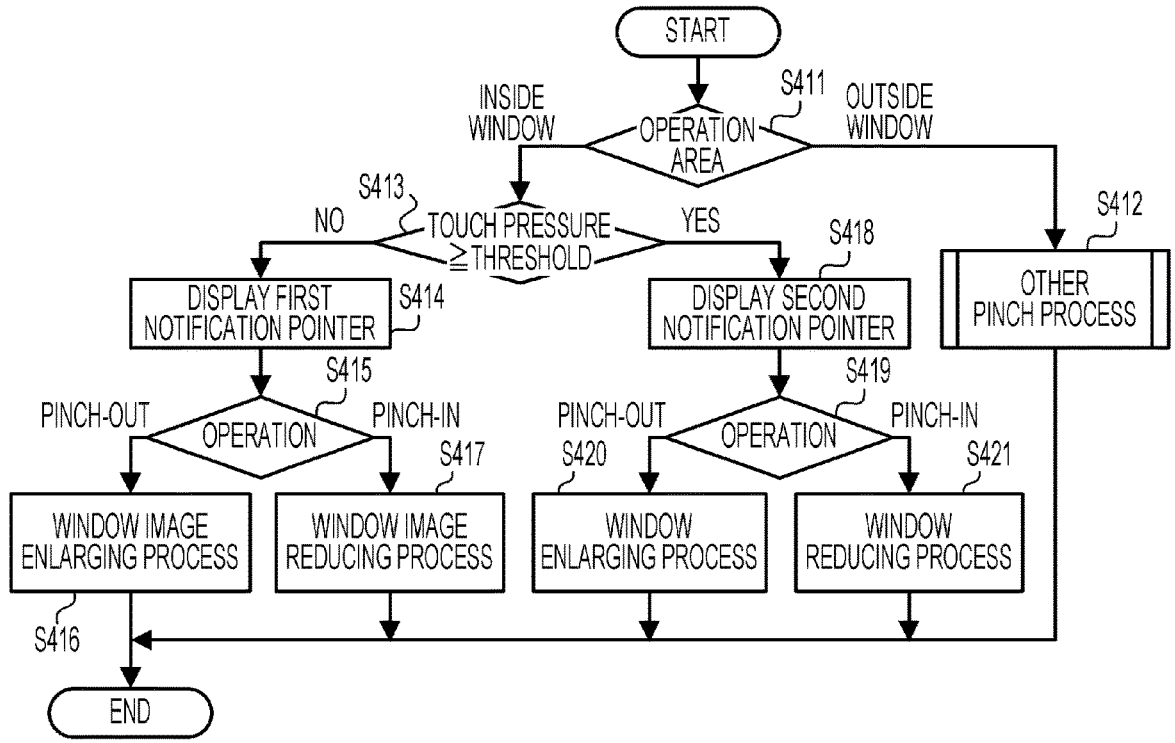

A process flow of the image display apparatus according to the present embodiment will be described with reference to FIGS. 4A and 4B. FIGS. 4A and 4B are flowcharts illustrating an example of a process flow of the image display apparatus according to the present embodiment. In a case where the control unit 101 detects a touch operation performed on the image display apparatus, the flowchart of FIG. 4A starts. The control unit 101 repeatedly performs a process of detecting a touch operation. In the present embodiment, detection of a touch state of the user's finger or the like on the touch panel 106 and acquisition of operation information (the number of touched positions, the coordinates of the respective touched positions, and the like) corresponding thereto are constantly performed by the touch panel controller 109. Moreover, a plurality of items of operation information acquired by the touch panel controller 109 within a predetermined period up to the present time point are held by the second storage unit 103. The control unit 101 detects a touch operation using the operation information held by the second storage unit 103. The touch operation may be detected using the operation information acquired lastly only or the touch operation may be detected using a plurality of items of operation information.

First, in S401, the control unit 101 detects the presence of a touch operation based on the operation information held by the second storage unit 103 and determines whether the type thereof is a pinch operation in a case where the touch operation is detected. In a case where a pinch operation is performed, a pinch process is performed in S402. In a case where a touch operation of a different type from the pinch operation is performed, another process corresponding to the type of the performed touch operation is performed in S403. Examples of the touch operation of a different type from the pinch operation include a touch operation (including a tap operation, a drag operation, and the like) that a touch is detected at one point of the screen, a touch operation (including a swipe operation) that a touch is detected at three or more points of the screen, and the like.

Next, the details of the pinch process of S402 will be described with reference to FIG. 4B.

First, in S411, the control unit 101 determines an area (an area inside the screen; an operation area) on which a pinch operation is performed. Specifically, it is determined an area in the screen, from which a pinch operation starts. In a case where a pinch operation is performed on an area outside the window (outside a display area of the window), another pinch process corresponding to the area and the performed pinch operation is performed in S412. In a case where a pinch operation is performed on an area inside the window (inside a display area of the window), the flow proceeds to S413. Hereinafter, a window on which a pinch operation is performed will be referred to as a "target window".

In S413, the control unit 101 determines whether the touch pressure of the performed pinch operation is equal to or larger than a threshold. In a case where the touch pressure is smaller than the threshold, the flow proceeds to S414. In a case where the touch pressure is equal to or larger than the threshold, the flow proceeds to S418. The threshold compared with the touch pressure may be a predetermined fixed value determined in advance by a manufacturer or may be a value that the user can define and change.

In the present embodiment, acquisition of the pressure information (the touch pressure) corresponding to the touch state of the user on the touch panel 106 is constantly performed by the touch panel controller 109. Moreover, a plurality of items of pressure information acquired by the touch panel controller 109 within a predetermined period up to the present time point are held by the second storage unit 103. The control unit 101 detects the touch pressure using the pressure information held by the second storage unit 103. The touch pressure may be detected using the pressure information acquired lastly only or the touch pressure may be detected using a plurality of items of pressure information.

In a case where the flow proceeds to S414, the display is changed as illustrated in FIG. 3A. First, in S414, the control unit 101 performs display control of displaying a first notification pointer (the notification pointer 303 illustrated in FIG. 3A) on the screen in order to notify the user of the fact that the performed pinch operation is a window image size changing operation. The window image size changing operation is a pinch operation of instructing execution of a window image size changing process, and the first notification pointer is a notification pointer indicating a window image size changing process or a window image size changing operation. In S415, the control unit 101 determines whether the performed pinch operation is a pinch-in operation or a pinch-out operation. By determining a change in a touch position (touched position) using the plurality of items of operation information held by the second storage unit 103, it is possible to determine whether the performed pinch operation is a pinch-in operation or a pinch-out operation. In a case where a pinch-out operation is performed, the flow proceeds to S416. In a case where a pinch-in operation is performed, the flow proceeds to S417.

In S416, the control unit 101 performs a window image enlarging process of enlarging an image in a target window. In S417, the control unit 101 performs a window image reducing process of reducing an image in the target window. Moreover, in S416 and S417, the control unit 101 performs display control of displaying a notification pointer (the notification pointers 304 and 306 illustrated in FIG. 3A) on the screen.

In a case where the flow proceeds from S413 to S418, the display is changed as illustrated in FIG. 3B. First, in S418, the control unit 101 performs display control of displaying a second notification pointer (the notification pointer 313 illustrated in FIG. 3B) on the screen in order to notify the user of the fact that the performed pinch operation is a window size changing operation. The window size changing operation is a pinch operation of instructing execution of a window size changing process and the second notification pointer is a notification pointer indicating a window size changing process or a window size changing operation. In S419, the control unit 101 determines whether the performed pinch operation is a pinch-in operation or a pinch-out operation. In a case where a pinch-out operation is performed, the flow proceeds to S420. In a case where a pinch-in operation is performed, the flow proceeds to S421.

In S420, the control unit 101 performs a window enlarging process of enlarging the target window. In S421, the control unit 101 performs a window reducing process of reducing the target window. Moreover, in S420 and S421, the control unit 101 performs display control of displaying a notification pointer (the notification pointers 314 and 316 illustrated in FIG. 3B) on the screen.

As described above, according to the present embodiment, a process corresponding to a pinch operation is executed selectively on one of a window and an image displayed in the window according to the magnitude of a touch pressure of a pinch operation performed within a display area of the window. In this way, it is possible to improve the operability of the touch operation. Specifically, the user can selectively instruct execution of a window size changing process and execution of a window image size changing process just by changing the touch pressure in such an immediate operation as a pinch operation within a display area of a window. In other words, with such an immediate operation of changing the magnitude of the touch pressure during a pinch operation within a display area of a window, the user can change the size of the window without changing the size of an image displayed on the window and change the size of an image displayed in the window without changing the size of the window. In this way, the user does not need to touch a predetermined narrow area such as an edge of a window and can suppress the occurrence of operation errors.

Moreover, according to the present embodiment, by displaying a notification image (a notification pointer), the user can easily understand whether the window size changing process or the window image size changing process is executed. The notification image is preferably displayed at a position away from a position touched in the pinch operation. In this way, it is possible to eliminate a problem that the notification image is invisible by being concealed by a finger (the visibility of the notification image is improved).

A method of detecting the touch pressure is not particularly limited. For example, the touch pressure may be or may not be detected based on an output signal of a sensor that outputs an electrical signal corresponding to pressure. Moreover, the touch pressure may be detected based on the size of a touched area so that the larger the size, the higher the detected touch pressure. According to such a configuration, since a physical sensor (the pressure sensor 107 illustrated in FIG. 1) is not necessary, it is possible to reduce the cost.

In the present embodiment, although an example in which the touch pressure (the touch pressure of the pinch operation) for the window image size changing process is weaker than the touch pressure for the window size changing process has been described, the present invention is not limited to this. For example, the touch pressure for the window image size changing process may be stronger than the touch pressure for the window size changing process. That is, the window size changing process may be performed in a case where a pinch operation with a weak touch pressure is performed, and the window image size changing process may be performed in a case where a pinch operation with a strong touch pressure is performed.

In the window size changing process, the size of the window is preferably changed to a size corresponding to a moving direction of the position touched in the pinch operation. For example, a horizontal size of the window may be changed according to a change amount corresponding to a change amount of a horizontal interval between two touch positions, and a vertical size of the window may be changed according to a change amount corresponding to a change amount of a vertical interval between two touch positions. The horizontal interval is the interval in a horizontal direction (a left-right direction), the vertical interval is the interval in a vertical direction (an up-down direction), the horizontal size is the size in the horizontal direction, and the vertical size is the size in the vertical direction. In this configuration, the vertical size of the window only is changed according to a pinch operation of changing only the vertical interval (the interval in the vertical direction) of two touch position. Moreover, the size of the window is changed by such a change amount that the ratio of the horizontal size change amount to the vertical size change amount is 2:1 according to such a pinch operation that the ratio of a change amount of a horizontal interval between two touch positions and a change amount of a vertical interval between two touch positions is 2:1. Since the size of the window is changed to a size corresponding to the moving direction of the touch position, the user can change the size of the window with a more immediate pinch operation. In the window image size changing process, the size of the image is preferably changed to a size corresponding to a moving direction of the touch position similarly to the window size changing process.

Figure 5A:
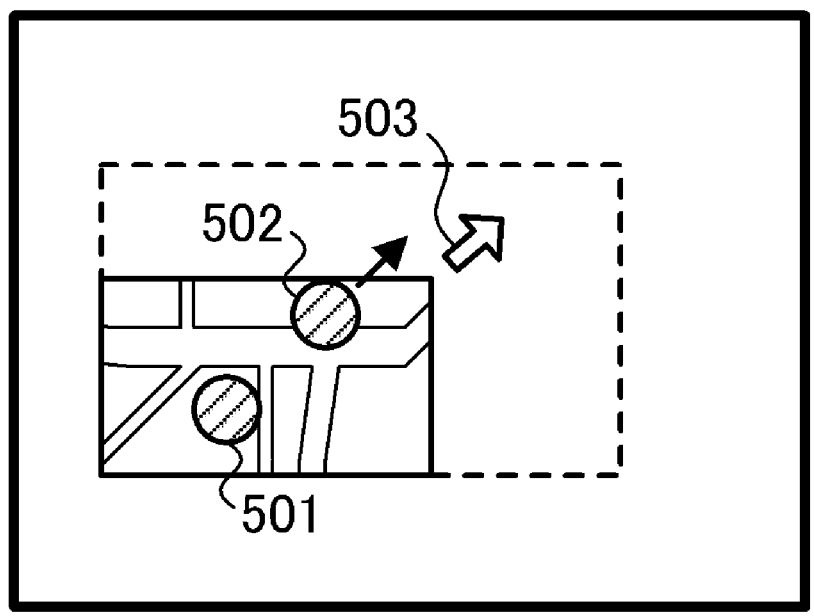
FIGS. 5A and 5B are diagrams illustrating an example of a window size changing process according to Embodiment 1.
Figure 5B:
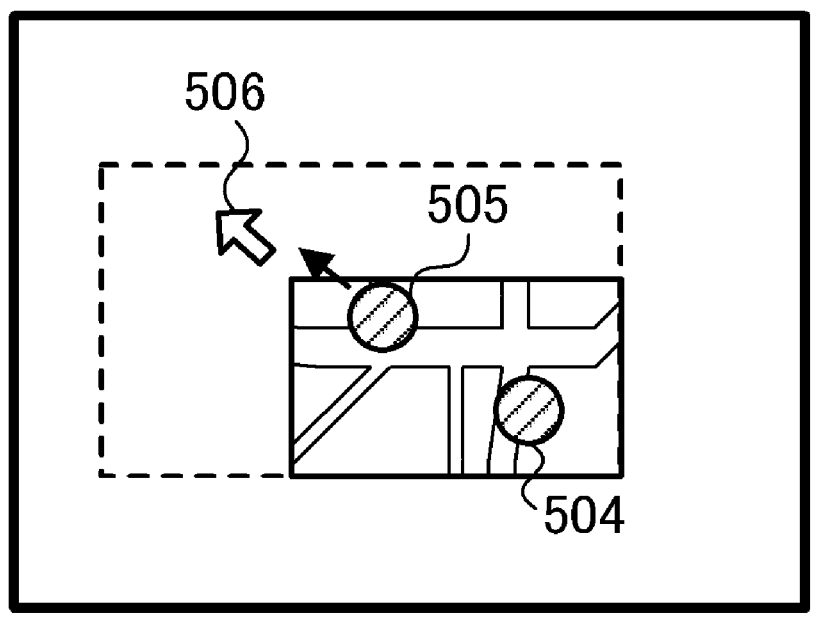

In FIGS. 3A and 3B, although an example in which both of two touch positions are moved is illustrated, only one of two touch positions may be moved. FIGS. 5A and 5B illustrate an example in which the size of a window is changed according to a pinch operation of moving one touch position only. In the example of FIG. 5A, a user touches the screen with two fingers 501 and 502 and performs a pinch-out operation of separating the finger 502 from the finger 501 without moving the finger 501. In this case, for example, the user changes the position of the top-right corner of the window whereby the window is enlarged as indicated by arrow 503. In the example of FIG. 5B, a user touches the screen with two fingers 504 and 505 and performs a pinch-out operation of separating the finger 505 from the finger 504 without moving the finger 504. In this case, for example, the user changes the position of the top-left corner of the window whereby the window is enlarged as indicated by arrow 506. In such a case, an image (an image indicating a window enlarging direction) like arrows 503 and 506 is preferably displayed as a notification image so that the user can easily understand the window enlarging direction. Although FIGS. 5A and 5B illustrate an example of performing a pinch-out operation, a pinch-in operation of moving only one of two touch positions may be performed. Moreover, although FIGS. 5A and 5B illustrate a pinch-out operation for the window size changing process, a pinch operation of moving only one of two touch positions may be performed as a pinch operation for the window image size changing process.

Embodiment 2

Hereinafter, Embodiment 2 of the present invention will be described. A user may want to change the size of a window in a predetermined direction only. For example, the user may want to change the horizontal size of the window only or the user may want to change the vertical size of the window only. In the present embodiment, an example in which the user can easily realize such a change will be described. In the following description, a configuration and a process different from those of Embodiment 1 will be described in detail, and description of the same configuration and process as those of Embodiment 1 will not be provided. Although the configuration of the image display apparatus according to the present embodiment is the same as that of Embodiment 1 (FIGS. 1, 2A, and 2B), the process of the control unit 101 is different from that of Embodiment 1.

Figure 6:
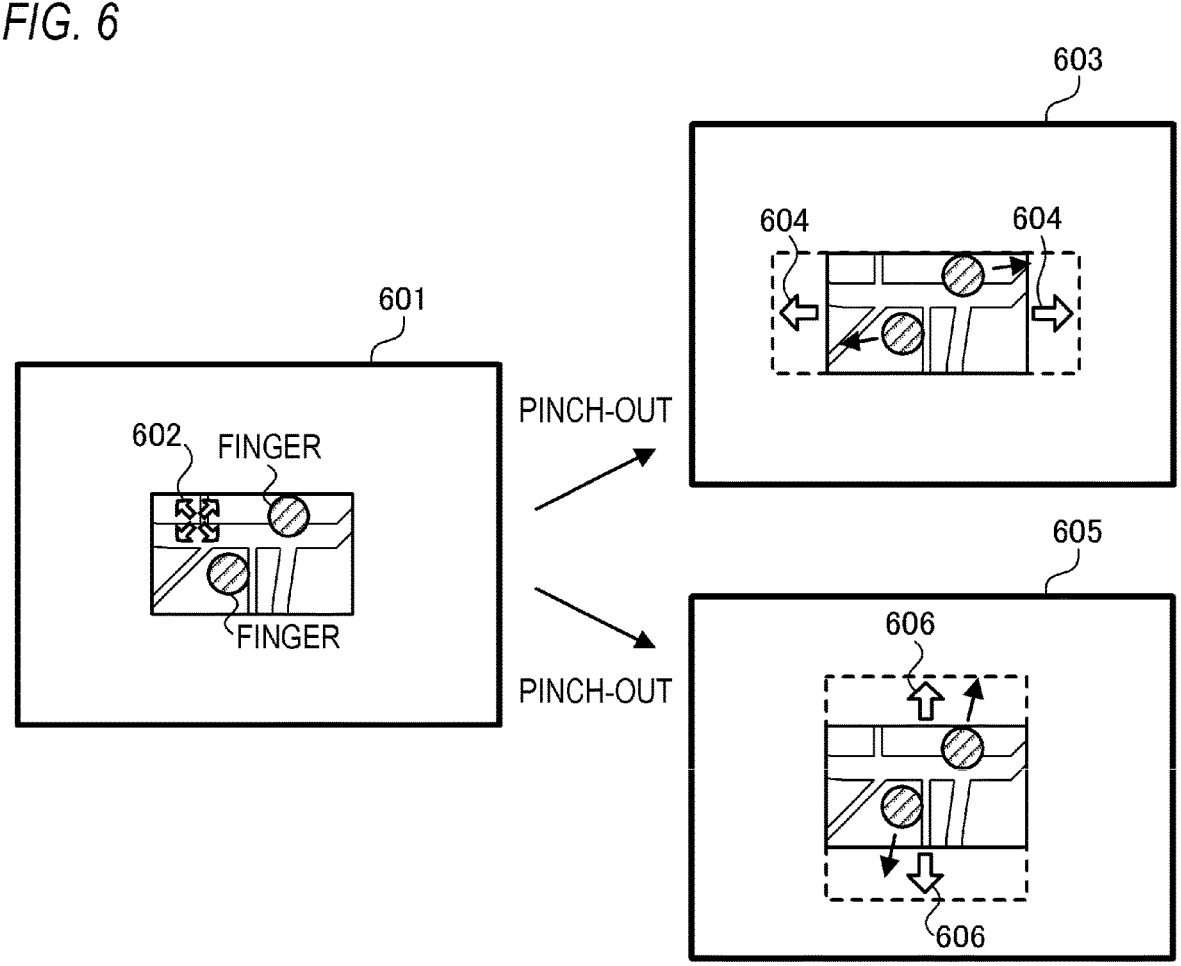
FIG. 6 is a diagram illustrating a display change example according to Embodiment 2.

FIG. 6 illustrates a display change example in a case where a pinch operation is performed on the inner side of the window. In the present embodiment, the control unit 101 determines a direction based on a variation (whether changed or maintained) in the touch pressure of the pinch operation in the window size changing process and changes the size of the window in the determined direction. Specifically, the control unit 101 determines whether the pinch operation is a window size changing operation or a window image size changing operation according to the touch pressure at the start of the pinch operation. Moreover, as in a display state 601, in a case where it is determined that the pinch operation is a window size changing operation, the control unit 101 performs display control of displaying a notification pointer 602 indicating the window size changing process (the window size changing operation) on the screen. After that, the control unit 101 determines the direction based on a variation in the touch pressure of the pinch operation and changes the size of the window in the determined direction.

In the present embodiment, in a case where the touch pressure is varied such that the touch pressure is smaller than a threshold, the control unit 101 selects the direction (an operation direction) corresponding to the pinch operation and changes the size of the window in the operation direction. The operation direction is a direction of changing the interval between two touch positions. That is, in a case where the variation occurs, the window size changing process is performed similarly to Embodiment 1.

In a case where the touch pressure is varied such that the touch pressure is equal to or larger than the threshold, the control unit 101 selects a predetermined direction and changes the size of the window in the predetermined direction. In the present embodiment, a horizontal direction or a vertical direction is selected as the predetermined direction. Specifically, in a case where a pinch operation is performed such that the changing direction is closer to the horizontal direction than the vertical direction, the horizontal direction is selected as the predetermined direction. In a case where the pinch operation is performed such that the changing direction is closer to the vertical direction than the horizontal direction, the vertical direction is selected as the predetermined direction. In this way, a display state 603 or a display state 605 is realized. Specifically, in a case where the horizontal direction is selected, the control unit 101 performs display control of displaying a notification pointer 604 indicating a window size changing process corresponding to the horizontal direction and changes the size of the window in the horizontal direction. The size of the window in the vertical direction is maintained (not changed). On the other hand, the control unit 101 performs display control of displaying a notification pointer 606 indicating the window size changing process corresponding to the vertical direction and changes the size of the window in the vertical direction. The size of the window in the horizontal direction is maintained.

FIG. 6 illustrates an example in a case where a pinch-out operation is performed. Thus, in FIG. 6, the notification pointer 604 indicates a window enlarging process of enlarging the window in the horizontal direction and the notification pointer 606 indicates a window enlarging process of enlarging the window in the vertical direction. In a case where a pinch-in operation is performed, a notification pointer indicating a window reducing process of reducing the window in the horizontal direction is displayed as a notification pointer corresponding to the horizontal direction. Moreover, a notification pointer indicating a window reducing process of reducing the window in the vertical direction is displayed as a notification pointer corresponding to the vertical direction.

The process flow of the image display apparatus according to the present embodiment will be described with reference to FIGS. 7A, 7B, 8A, and 8B. FIGS. 7A, 7B, 8A, and 8B are flowcharts illustrating an example of a process flow of the image display apparatus according to the present embodiment. In a case where the control unit 101 detects a touch operation performed on the image display apparatus, the flowchart of FIG. 7A starts.

First, in S701, the control unit 101 determines whether the performed touch operation is a pinch operation. The process of S701 is the same as the process of S401 of FIG. 4A. In a case where a pinch operation is performed, a pinch process is performed in S702. In a case where a touch operation different from the pinch operation is performed, the processes of S703 and S704 are performed. In S703, the control unit 101 sets an operation flag F to 0. Moreover, in S704, the control unit 101 performs another process corresponding to the performed touch operation. The process of S704 is the same as the process of S403 of FIG. 4A.

The operation flag F is a flag indicating a touch operation. An operation flag F=0 indicates a touch operation other than the pinch operation, an operation flag F=1 indicates a window image size changing operation, and an operation flag F=2 indicates a window size changing operation. In the present embodiment, the initial value of the operation flag F is 0.

Figure 7A:
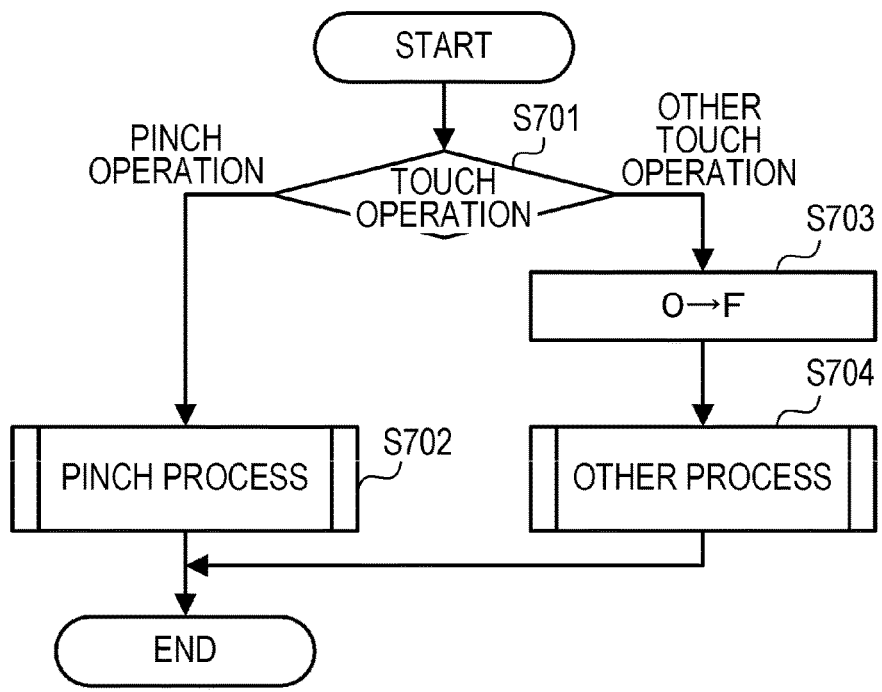
FIGS. 7A and 7B are flowcharts illustrating an example of a process flow of an image display apparatus according to Embodiment 2.
Figure 7B:
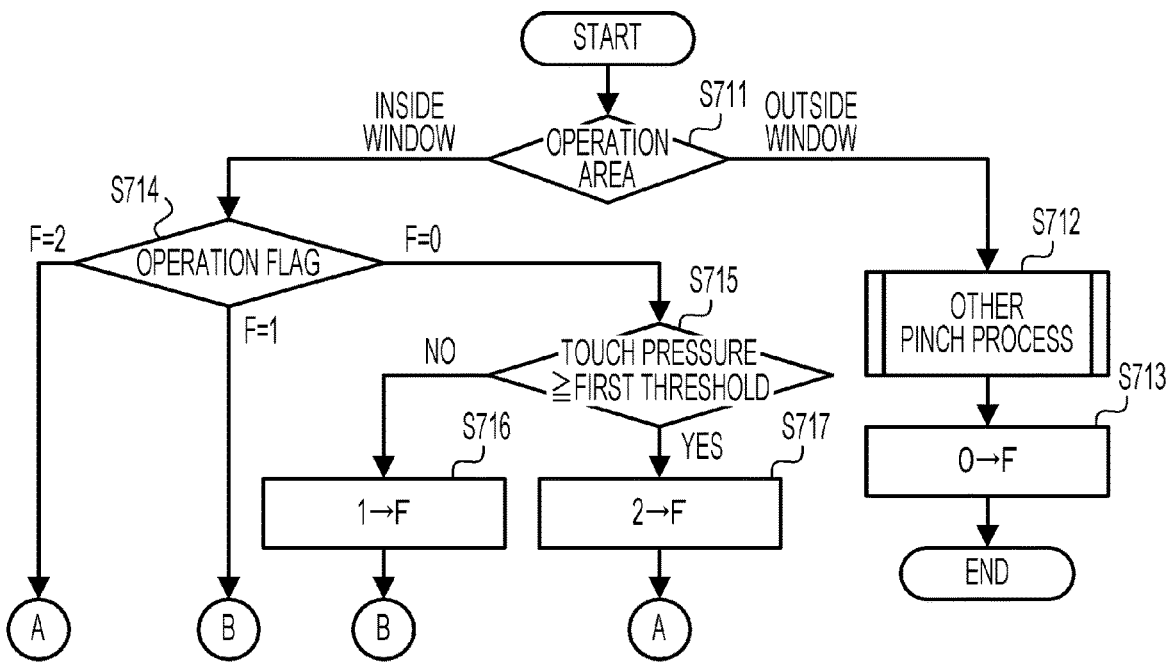

Next, the details of the pinch process of S702 will be described with reference to FIG. 7B.

First, in S711, the control unit 101 determines an operation area. In a case where the operation area is an area outside a window, the processes of S712 and S713 are performed. In S712, the control unit 101 performs another pinch process corresponding to the operation area and the performed pinch operation. In S713, the control unit 101 sets the operation flag F to 0. The process of S711 is the same as the process of S411 of FIG. 4B, and the process of S712 is the same as the process of S412 of FIG. 4B. In a case where the operation area is an area inside a window, the flow proceeds to S714.

Figure 8A:
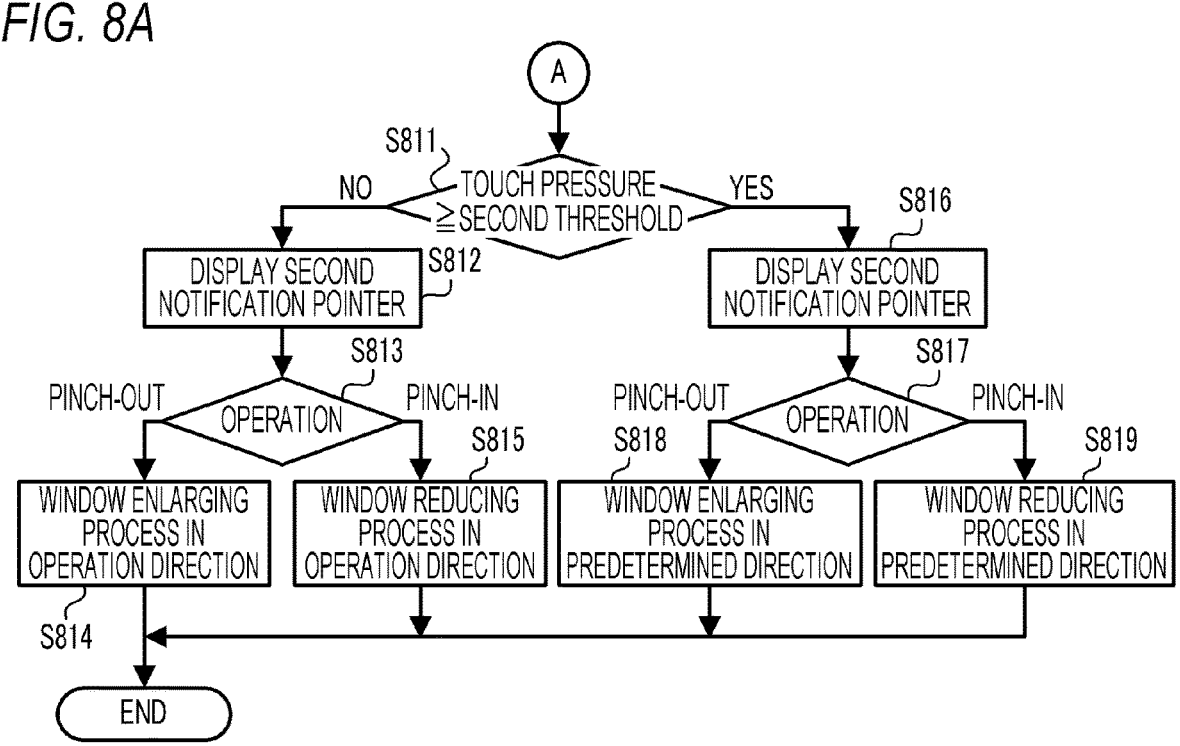
FIGS. 8A and 8B are flowcharts illustrating an example of a process flow of the image display apparatus according to Embodiment 2.
Figure 8B:
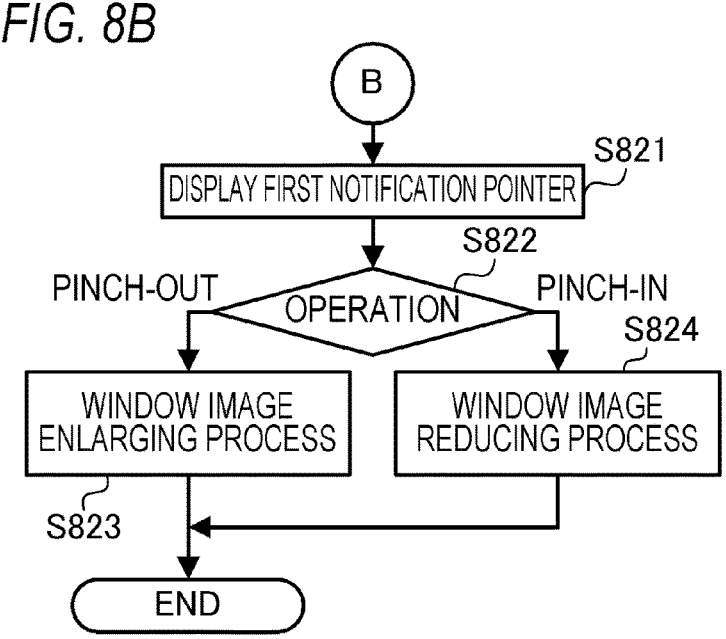

In S714, the control unit 101 checks the operation flag F. In a case where the operation flag F=0, the flow proceeds to S715. In a case where the operation flag F=1, the flowchart of FIG. 8B is executed. In a case where the operation flag F=2, the flowchart of FIG. 8A is executed. The flowchart of FIG. 8A will be described later. In FIG. 8B, the same window image size changing process as Embodiment 1 is performed by the processes of S822 to S825 (FIG. 3A). The processes of S822 to S825 are the same as the processes of S414 to S417 of FIG. 4B.

In S715, the control unit 101 determines whether the touch pressure (the present touch pressure) of the performed pinch operation is equal to or larger than a first threshold. The process of S715 is the same as the process of S413 of FIG. 4B. In a case where the touch pressure is smaller than the first threshold, the control unit 101 sets the operation flag F to 1 in S716. After that, the flowchart of FIG. 8B is executed. In a case where the touch pressure is equal to or larger than the first threshold, the control unit 101 sets the operation flag F to 0 in S717. After that, the flowchart of FIG. 8B is executed.

The flowchart of FIG. 8A will be described. First, in S811, the control unit 101 determines whether the touch pressure (the present touch pressure) of the performed pinch operation is equal to or larger than a second threshold. The process of S811 is performed at a different time point from the process of S715 of FIG. 7B. Thus, the touch pressure used in the process of S811 may be different from the touch pressure used in the process of S715. In a case where the touch pressure is smaller than the second threshold, the flow proceeds to S812. In a case where the touch pressure is equal to or larger than the second threshold, the flow proceeds to S816.

In the present embodiment, a value larger than the first threshold is used as the second threshold. The relation between the first and second thresholds is not particularly limited. The second hold may be the same value as the first threshold or the second threshold may be a value smaller than the first threshold. The first and second thresholds may be predetermined fixed values determined in advance by a manufacturer or may be values that the user can change.

In a case where the flow proceeds from S811 to S812, the same window size changing process as Embodiment 1 is performed by the processes of S812 to S815 (FIGS. 3B, 5A, and 5B). The processes of S812 to S815 are the same as the processes of S418 to S421 of FIG. 4B. In S814 or S815, the control unit 101 selects an operation direction (the direction corresponding to the pinch operation) and changes the size of a target window in the operation direction.

In a case where the flow proceeds from S811 to S816, the display is changed as illustrated in FIG. 6 by the processes of S816 to S819. First, in S816, the control unit 101 performs display control of displaying a second notification pointer (the notification pointer 313 illustrated in FIG. 3B) on the screen in order to notify the user of the fact that the performed pinch operation is a window size changing operation. In S617, the control unit 101 determines whether the performed pinch operation is a pinch-in operation or a pinch-out operation. In a case where the pinch-out operation is performed, the flow proceeds to S818. In a case where the pinch-in operation is performed, the flow proceeds to S819.

In S818, the control unit 101 executes a predetermined direction enlarging process of selecting a predetermined direction (a horizontal direction or a vertical direction) and enlarging a target window in the selected direction as a window size changing process. In S819, the control unit 101 executes a predetermined direction reducing process of selecting a predetermined direction (a horizontal direction or a vertical direction) and reducing a target window in the selected direction as a window size changing process. Moreover, in S818 and S819, the control unit 101 also performs display control of displaying a notification pointer (the notification pointers 604 and 606 illustrated in FIG. 6B) indicating a window size changing process to be executed on the screen.

In S818 and S819, a horizontal direction is selected in a case where a pinch process is performed such that a changing direction of the interval between two touch positions is close to the horizontal direction and a vertical direction is selected in a case where a pinch process is performed such that the changing direction is close to the vertical direction. For example, the control unit 101 compares a change amount of a horizontal interval between two touch positions with a change amount of a vertical interval between two touch positions. Moreover, the control unit 101 selects the horizontal direction in a case where the change amount of the horizontal interval is larger than the change amount of the vertical interval and selects the vertical direction in a case where the change amount of the horizontal interval is smaller than the change amount of the vertical interval.

As described above, according to the present embodiment, in the window size changing process, the direction is determined based on a variation in the touch pressure and the size of the window in the determined direction is changed. In this way, it is possible to further improve the operability of the touch operation. Specifically, the user can change the size of the window in a desired direction only just by changing the variation in the touch pressure.

Moreover, according to the flowcharts of FIGS. 7A, 7B, 8A, and 8B, in a case where a pinch operation is repeatedly performed in a window, the same enlarging and reducing process as the previous process is performed. Specifically, the process of performing the same enlarging and reducing process as the previous process is realized based on the determination in S714. A plurality of repeated pinch operations are highly likely to be a pinch operation that aims the same enlarging and reducing process. Thus, by the process of performing the same enlarging and reducing process as the previous process, the user can easily cause the apparatus to perform the same enlarging and reducing process as the previous process without paying attention to the touch pressure whenever the pinch operation is performed. The process of performing the same enlarging and reducing process as the previous process may be omitted. For example, in a case where it is determined in S711 that the operation area is an area inside the window, the process may proceed from S711 to S715.

A method of determining the direction (a method of selecting the direction) is not particularly limited. For example, a similarity between a horizontal direction and a changing direction of the interval between two touch positions and a similarity between a vertical direction and the changing direction may be determined and compared. Moreover, the horizontal direction may be selected in a case where the similarity between the changing direction and the horizontal direction is higher than the similarity between the changing direction and the vertical direction, and the vertical direction may be selected in a case where the similarity between the changing direction and the vertical direction is higher than the similarity between the changing direction and the horizontal direction. The predetermined direction may not include at least one of the horizontal direction and the vertical direction or may include an oblique direction. One of a plurality of directions prepared as a predetermined direction may be selected and the operation direction (the direction corresponding to the pinch operation) may not be selected. The direction may be determined according to the change amount (a variation amount) of the touch pressure. The horizontal direction may be selected in a case where the change amount of the touch pressure is within a first value range, the vertical direction may be selected in a case where the change amount of the touch pressure is within a second value range, and the operation direction may be selected in a case where the change amount of the touch pressure is within a third value range.

Embodiment 3

Hereinafter, Embodiment 3 of the present invention will be described. In Embodiments 1 and 2, although an example of performing a pinch operation has been described, an example of performing a touch operation of touching on one point of a screen will be described in the present embodiment. However, the configuration of the present embodiment to be described later can be applied to a case of performing a touch operation of touching on a plurality of points of a screen. In the following description, a configuration and a process different from those of Embodiments 1 and 2 will be described in detail, and description of the same configuration and process as those of Embodiments 1 and 2 will not be provided. Although the configuration of the image display apparatus according to the present embodiment is the same as those of Embodiments 1 and 2 (FIGS. 1, 2A, and 2B), the process of the control unit 101 is different from those of Embodiments 1 and 2.

In the present embodiment, the control unit 101 sets a determination area corresponding to a touch position. In this case, the control unit 101 changes the size of the determination area according to the touch pressure. Moreover, in a case where a display position of an edge of a window is included in the determination area, the control unit 101 determines that a touch operation of selecting the display position (the edge of the window) has been performed. In a case where a touch operation of selecting the display position of an edge of a window is detected, the control unit 101 executes a window size changing process according to movement of the touch position. That is, in a case where a drag operation of moving a touch position is detected as a touch operation of selecting a display position of an edge of a window, the control unit 101 executes a window size changing process according to the drag operation. The touch operation of selecting the display position of an edge of a window is not limited to the drag operation, and the process corresponding to the touch operation is not limited to the window size changing process. For example, a tap operation may be performed as a touch operation of selecting the display position of an edge of a window, and display control of displaying property information of the window may be performed according to the tap operation.

In the present embodiment, although an example in which one circular area around one touch position is set as a determination area has been described, the present invention is not limited to this. For example, an area group including a plurality of areas may be set for one touch position as the determination area. The shape of the determination area may be a rectangle, a pentagon, a hexagon, an ellipse, or the like. A contour of the determination area may have both a linear portion and a curve portion. A determination area may be set around a position different from the touch position. The determination area may include a touch position or the determination area may not include a touch position. However, the center of the determination area is preferably located close to the touch position to realize a more immediate operation. The center of the determination area is particularly preferably identical to the touch position.

Figure 9A:
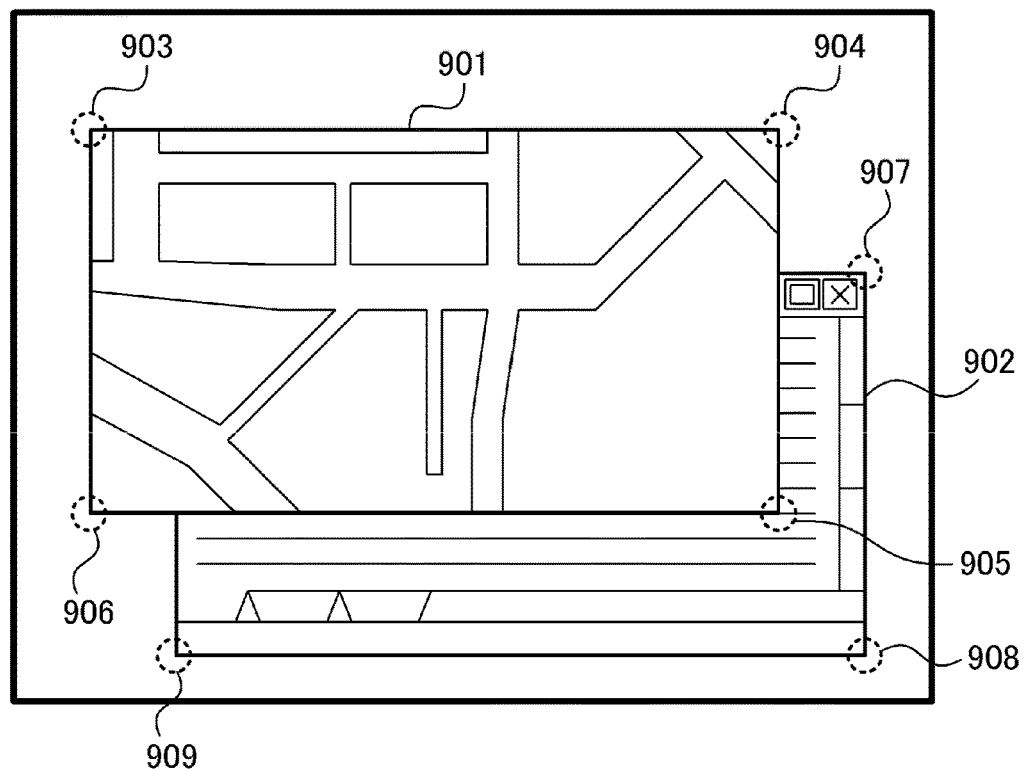
FIGS. 9A and 9B are diagrams illustrating an example of a determination area according to Embodiment 3.
Figure 9B:
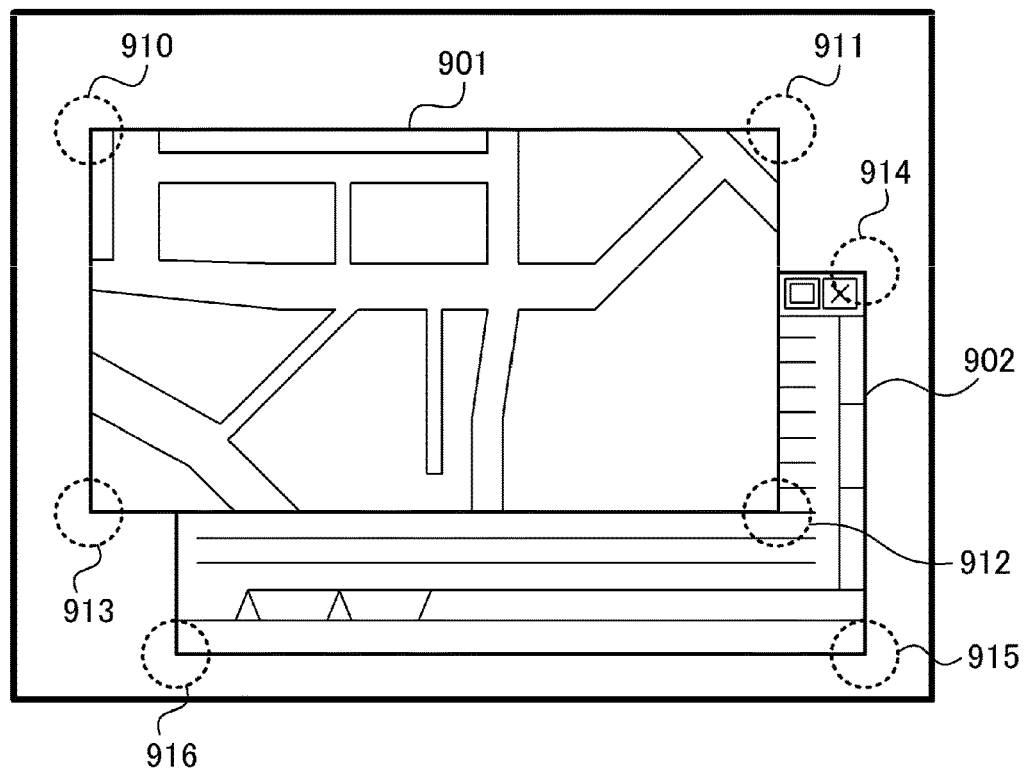

FIGS. 9A and 9B are diagrams illustrating an example of a determination area. FIG. 9A illustrates an example in a case where a touch operation with a weak touch pressure (a normal touch pressure) is performed and FIG. 9B illustrates an example in a case where a touch operation with a strong touch pressure is performed. Seven determination areas 903 to 909 are illustrated in FIG. 9A and seven determination areas 910 to 916 are illustrated in FIG. 9B. From FIGS. 9A and 9B, it can be understood that the determination areas 910 to 916 are larger than the determination areas 903 to 909. In this manner, in the present embodiment, the size of the determination area in a case where the touch pressure is strong is changed to a larger size than that in a case where the touch pressure is weak.

The correlation between the touch pressure and the size of the determination area is not particularly limited. For example, the determination area in a case where the touch pressure is weak (the touch pressure is a normal touch pressure) may be set to be larger than that in a case where the touch pressure is strong. A large determination area may be set in a case where the touch pressure is within a predetermined value range, and a small determination area may be set in a case where the touch pressure is outside the predetermined value range. However, in a configuration in which a small determination area is set in a case where a normal touch operation is performed (in a case where the touch pressure is a normal touch pressure), since the operation of the apparatus during a normal touch operation is similar to the operation of an existing apparatus, the compatibility between the touch operation and various processes can be enhanced.

In FIGS. 9A and 9B, a window 901 is a window that displays a map, and a window 902 is a window on which spreadsheet software runs. A portion (the top-left portion) of the window 902 is concealed under the window 901. An image displayed in the window is not particularly limited. The determination areas 903 to 906 and 910 to 913 include an edge (corner) of the window 901. Thus, in a case where one of the eight determination areas 903 to 906 and 910 to 913 is set, the control unit 101 determines that a touch operation of selecting the corner of the window 901 has been performed. For example, in a case where the determination area 911 (a determination area corresponding to the top-right corner of the window 901) is set, the control unit 101 determines that a touch operation of selecting the top-right corner of the window 901 has been performed. Moreover, the control unit 101 performs a window size changing process of changing the size of the window 901 according to a drag operation of moving a touch position corresponding to any one of the eight determination areas 903 to 906 and 910 to 913. For example, a window size changing process of changing the size (the height, the width, or both) of the window 901 by changing the position of the top-right corner of the window 901 according to a drag operation of moving the touch position corresponding to the determination area 911 is performed.

The determination areas 907 to 909 and 914 to 916 include a corner of the window 902. Thus, in a case where one of the six determination areas 907 to 909 and 914 to 916 is set, the control unit 101 determines that a touch operation of selecting the corner of the window 902 has been performed. Moreover, the control unit 101 performs a window size changing process of changing the size of the window 902 according to a drag operation of moving the touch position corresponding to any one of the six determination areas 907 to 909 and 914 to 916.

In a case where a touch operation of touching on a plurality of points of a screen is performed, a plurality of determination areas corresponding to a plurality of touch positions may be set. Moreover, a window size changing process may be performed according to a drag operation of moving the plurality of touch positions. For example, the determination area 910 (the determination area corresponding to the top-left corner of the window 901) and the determination area 912 (the determination area corresponding to the bottom-right corner of the window 901) may be set. Moreover, a window size changing operation of changing the size of the window 901 by changing the positions of the top-left corner and the bottom-right corner of the window 901 according to a drag operation of moving two touch positions corresponding to the two determination areas 910 and 912 may be performed.

Figure 10:
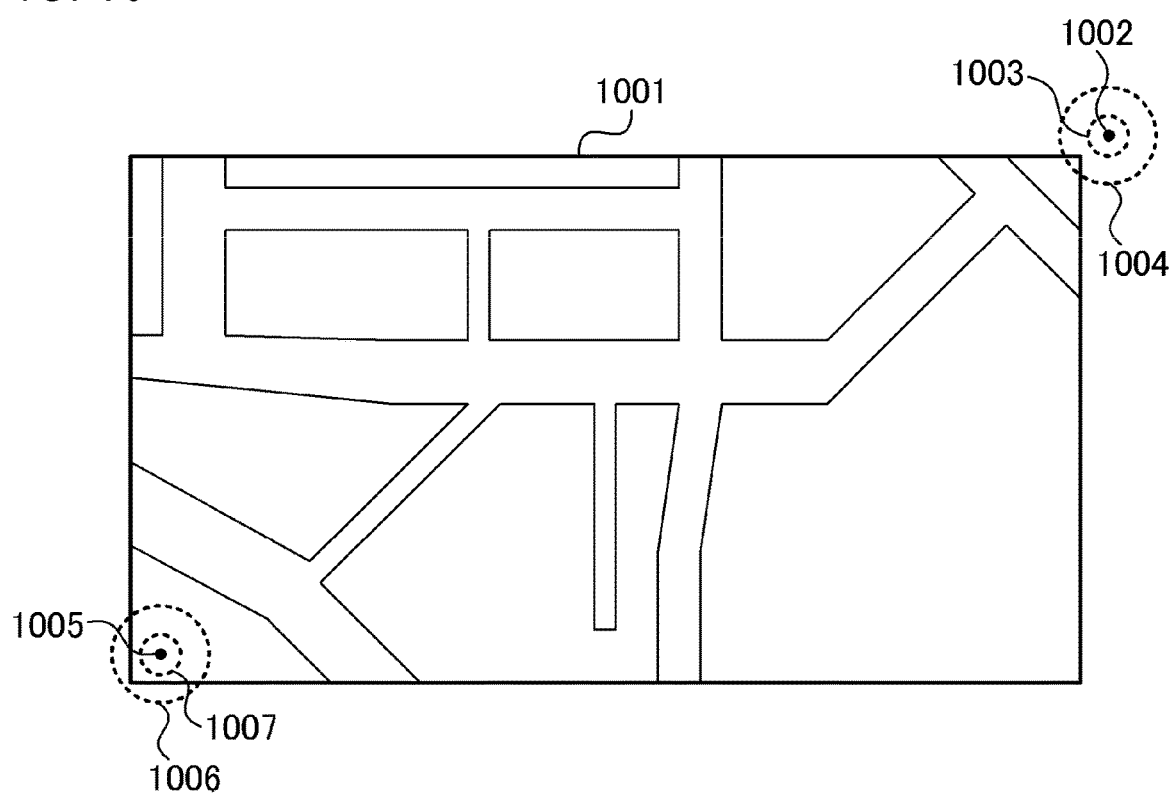
FIG. 10 is a diagram for describing an example of a problem and an advantage according to Embodiment 3.

FIG. 10 is a diagram illustrating an example of a determination area and is a diagram for describing examples of the problem and the effect of the present embodiment. First, a case in which a user wants to touch on an edge of a window will be described. Since the edge area of a window is small, the user may be often unable to touch on the edge of the window. For example, even when the user tries to touch on the top-right corner of a window 1001, a position 1002 distant from the top-right corner of the window 1001 may be touched. Thus, in a case where a small area is always set as the determination area, a determination area 1003 that does not include the top-right corner of the window 1001 is set and the user cannot select the top-right corner of the window 1001. As a result, a process different from the process intended by the user is executed erroneously. For example, a process different from a window size changing process of changing the size of the window 1001 according to a drag operation of moving the touch position 1002 is executed.

On the other hand, in the present embodiment, a determination area of a large size is set in a case where a user touches on the determination area with a strong touch pressure. Thus, a determination area 1004 larger than the determination area 1003 is set by the user just strengthening the touch pressure on the touch position 1002. Since the determination area 1004 includes the top-right corner of the window 1001, the top-right corner of the window 1001 is selected and the process intended by the user is performed. For example, a window size changing process of changing the size of the window 1001 is executed according to a drag operation of moving the touch position 1002.

Next, a case in which a user wants to touch on a position close to an edge of a window will be described. Specifically, a case in which a position 1005 is touched for the purpose of touching on a position inside the window 1001 will be described. In a case where a large area is always set as the determination area, a determination area 1006 that includes the bottom-left corner of the window 1001 is set, and the bottom-left corner of the window 1001 is selected. As a result, a process different from the process intended by the user is executed erroneously. For example, a window size changing process of changing the size of the window 1001 is executed according to a drag operation of moving the touch position 1005. The same problem (operation errors and processing errors) occurs in a case where a user wants to touch on a position outside a window.

On the other hand, in the present embodiment, a determination area of a small size is set in a case where a user touches the determination area with a weak touch pressure. Thus, a determination area 1007 smaller than the determination area 1006 is set by the user just weakening the touch pressure on the touch position 1005. Since the determination area 1007 does not include a corner of the window 1001, the corner of the window 1001 is not selected and the process intended by the user is performed. For example, a process of moving an image in the window 1001 is executed according to a drag operation of moving the touch position 1005.

As described above, in a case where a determination area of always the same size is set, operation errors and processing errors are likely to occur. On the other hand, in the present embodiment, since the size of the determination area is changed according to the touch pressure, the user can cause the apparatus to perform a desired process with a simple operation of changing the touch pressure.

Figure 11A:
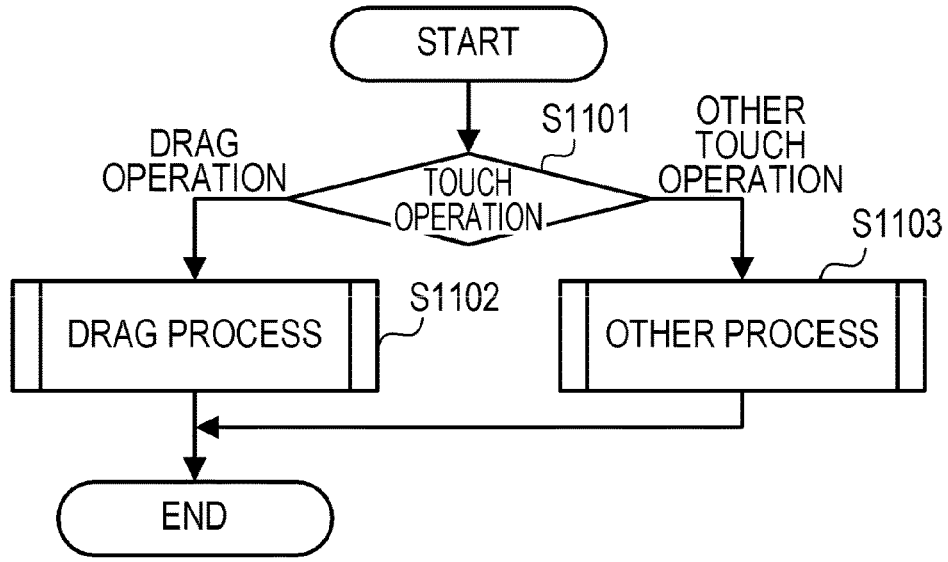
FIGS. 11A and 11B are flowcharts illustrating an example of a process flow of an image display apparatus according to Embodiment 3.
Figure 11B:
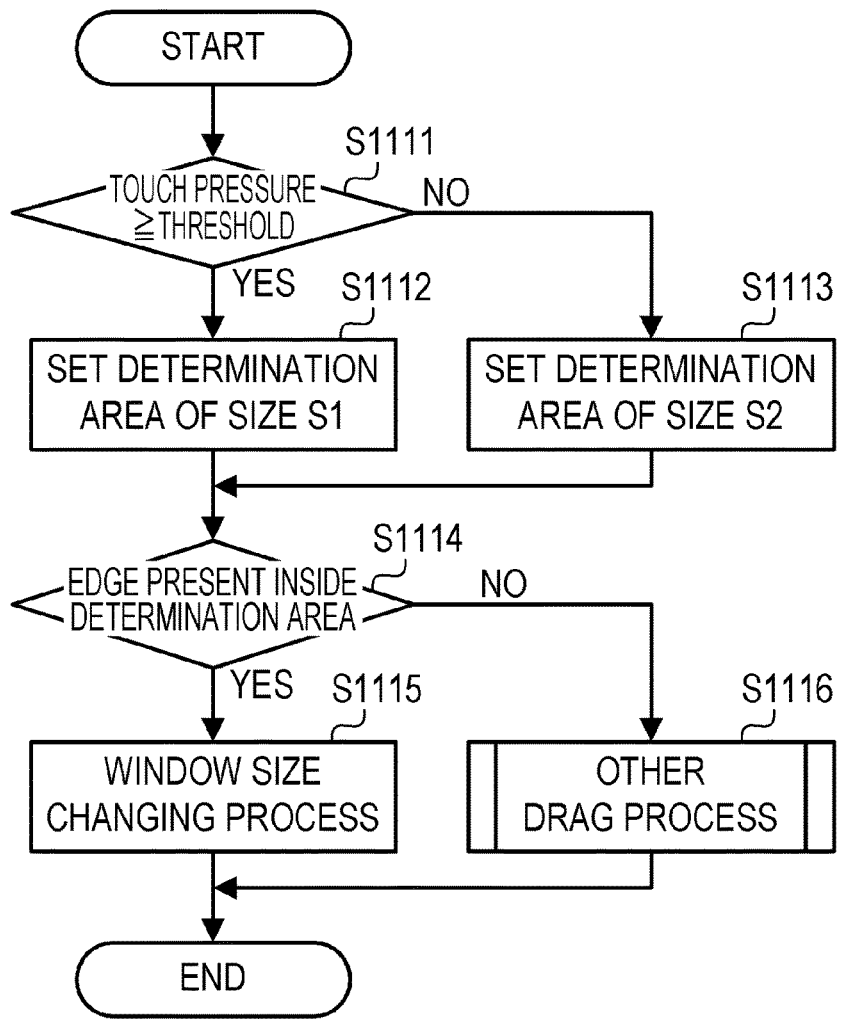

A process flow of the image display apparatus according to the present embodiment will be described with reference to FIGS. 11A and 11B. FIGS. 11A and 11B are flowcharts illustrating an example of a process flow of the image display apparatus according to the present embodiment. In a case where the control unit 101 detects a touch operation performed on the image display apparatus, the flowchart of FIG. 11A starts.

First, in S1101, the control unit 101 determines whether the performed touch operation is a drag operation. Whether the touch operation is a drag operation or not is determined based on the operation information held by the second storage unit 103 similarly to the process of S401 in FIG. 4A. In a case where the drag operation is performed, a drag process is performed in S1102. In a case where a touch operation different from the drag operation is performed, another process corresponding to the performed touch operation is performed in S1103.

Next, the details of the drag process of S1102 will be described with reference to FIG. 11B.

First, in S1111, it is determined whether the touch pressure of the performed drag operation is equal to or larger than a threshold. In a case where the touch pressure is equal to or larger than the threshold, the flow proceeds to S1112. In a case where the touch pressure is smaller than the threshold, the flow proceeds to S1113. The threshold compared with the touch pressure may be a predetermined fixed value determined in advance by a manufacturer or may be a value that the user can change.

In S1112, the control unit 101 sets a determination area of a size (radius) S1. In S1113, the control unit 101 sets a determination area of a size S2. The size S1 is larger than the size S2. The sizes S1 and S2 may be predetermined fixed values determined in advance by a manufacturer or may be values that the user can change. After the process of S1112 or S1113 is performed, the flow proceeds to S1114.

According to the process of S1112, the size of the determination area is determined so that the size of the determination area is gradually increased with an increase in the touch pressure. However, a method of determining the size is not limited to this. For example, the size of the determination area may be determined so that the size of the determination area is continuously increased with an increase in the touch pressure. Moreover, according to the process of S1112, the number of values that the size of the determination area can take is 2. However, the number of values that the size of the determination area can take may be larger than 2. For example, a determination area of a first size may be set in a case where the touch pressure is within a first value range, a determination area of a second size may be set in a case where the touch pressure is within a second value range, and a determination area of a third size may be set in a case where the touch pressure is within a third value range.

In S1114, the control unit 101 determines whether an edge of the window is included in the set determination area. In a case where the edge of the window is included in the determination area, the control unit 101 determines that a drag operation has been performed on an edge of the window and the flow proceeds to S1115. Specifically, it is determined that a drag operation has been performed on a portion of an edge of the window, included in the determination area. Since the size S1 is larger than the size S2, in a case where the determination area of the size S1 is set, it is more likely to be determined that the drag operation on the edge of the window has been performed than a case where the determination area of the size S2 is set. In a case where the edge of the window is not included in the determination area, the control unit 101 determines that a drag operation different from the drag operation on the edge of the window has been performed, and the flow proceeds to S1116.

In S1115, the control unit 101 performs a window size changing process according to the performed drag operation. In S1116, the control unit 101 performs another drag process corresponding to the touch position of the performed drag operation and a moving direction of the touch position.

As described above, according to the present embodiment, the size of the determination area is changed according to the touch pressure. Moreover, in a case where a display position of an edge of a window is included in the determination area, it is determined that a touch operation of selecting the display position has been performed. In this way, it is possible to improve the operability of the touch operation. Specifically, the user can easily select an edge of a window and select a position close to an edge of a window with a simple operation of changing the touch pressure. Moreover, the user can easily cause the apparatus to perform a desired process.

Embodiment 4

Hereinafter, Embodiment 4 of the present invention will be described. In the present embodiment, an example in which the image display apparatus (the information processing apparatus) performs the same process as Embodiment 3 and further performs display control of displaying the same notification image as described in Embodiment 1 and the like will be described. In the following description, a configuration and a process different from those of Embodiment 3 will be described in detail, and description of the same configuration and process as those of Embodiment 3 will not be provided. The configuration of the image display apparatus according to the present embodiment is the same as that of Embodiment 3 (FIGS. 1, 2A, and 2B). However, in the present embodiment, the control unit 101 further performs display control of displaying a notification image on the screen.

Figure 12:
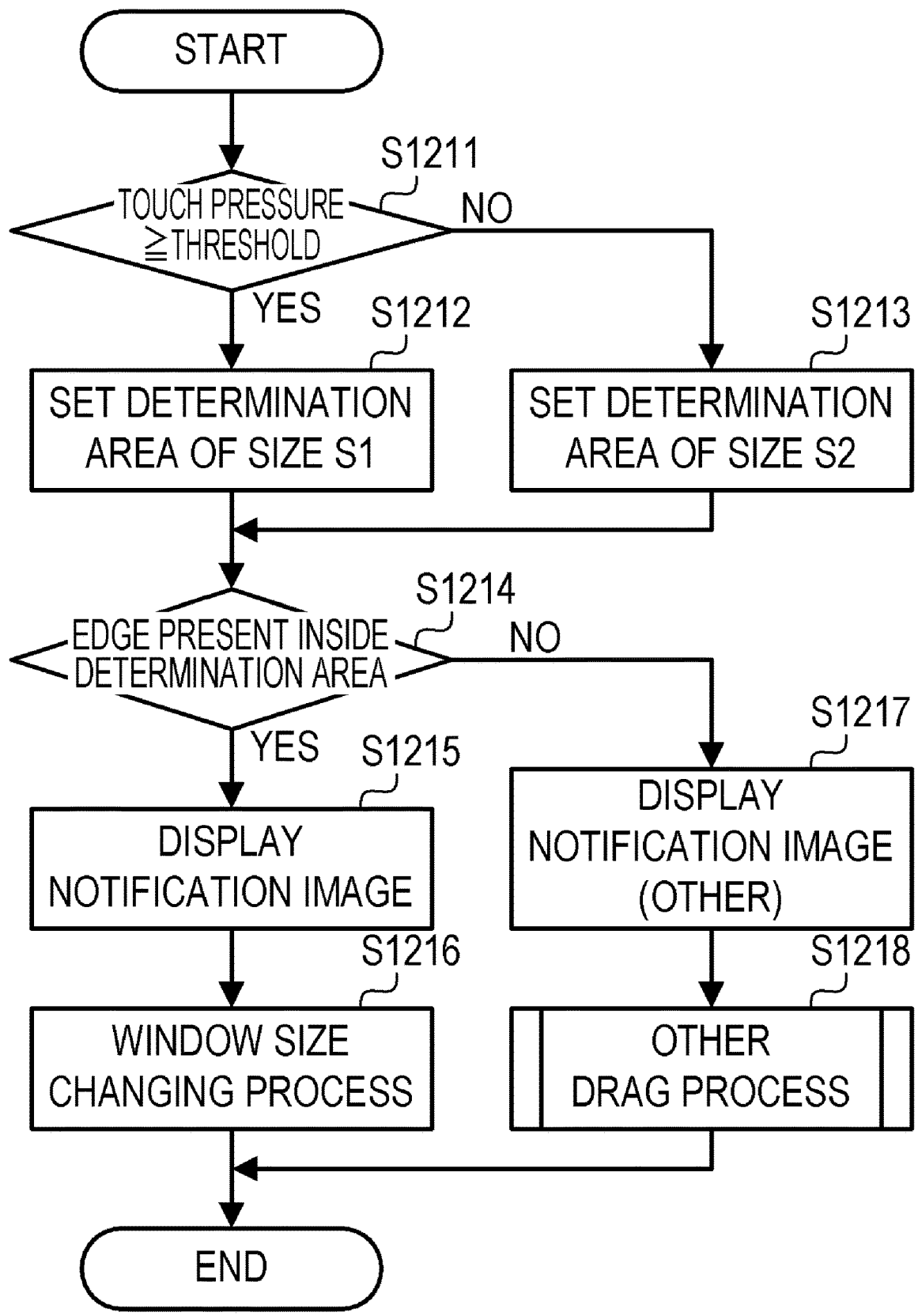
FIG. 12 is a flowchart illustrating an example of a process flow of an image display apparatus according to Embodiment 4.

The details of a drag process (S1102 in FIG. 11A) according to the present embodiment will be described with reference to FIG. 12. FIG. 12 is a flowchart illustrating an example of a process flow of a drag process according to the present embodiment. The processes of S1211 to S1214 are the same as the processes of S1111 to S1114 in FIG. 11B. In a case where an edge of a window is included in a determination area, the flow proceeds from S1214 to S1215 and the processes of S1215 and S1216 are performed. In a case where an edge of a window is not included in a determination area, the flow proceeds from S1214 to S1217 and the processes of S1217 and S1218 are performed. The process of S1216 is the same as the process of S1115 in FIG. 11B, and the process of S1218 is the same as the process of S1116. In S1215, the control unit 101 performs display control of displaying a notification image indicating the window size changing process performed in S1216 on the screen. In S1217, the control unit 101 performs display control of displaying a notification image indicating the other drag process performed in S1218 on the screen.

Figure 13A:
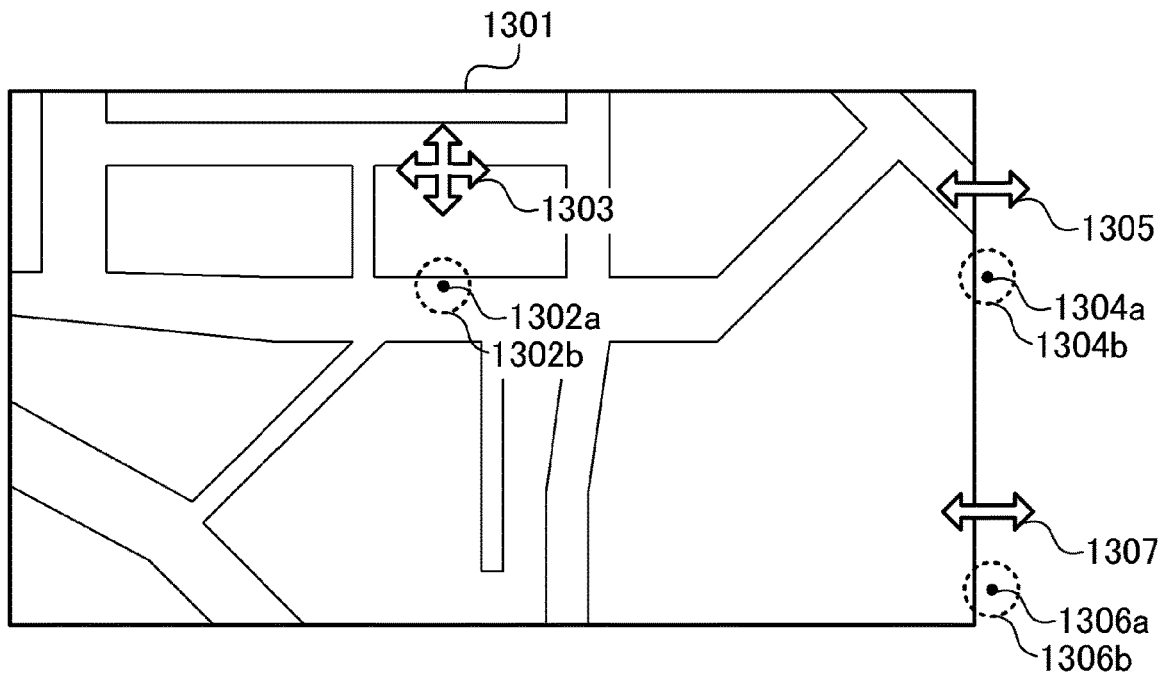
FIGS. 13A and 13B are diagrams illustrating an example of a notification image according to Embodiment 4.
Figure 13B:
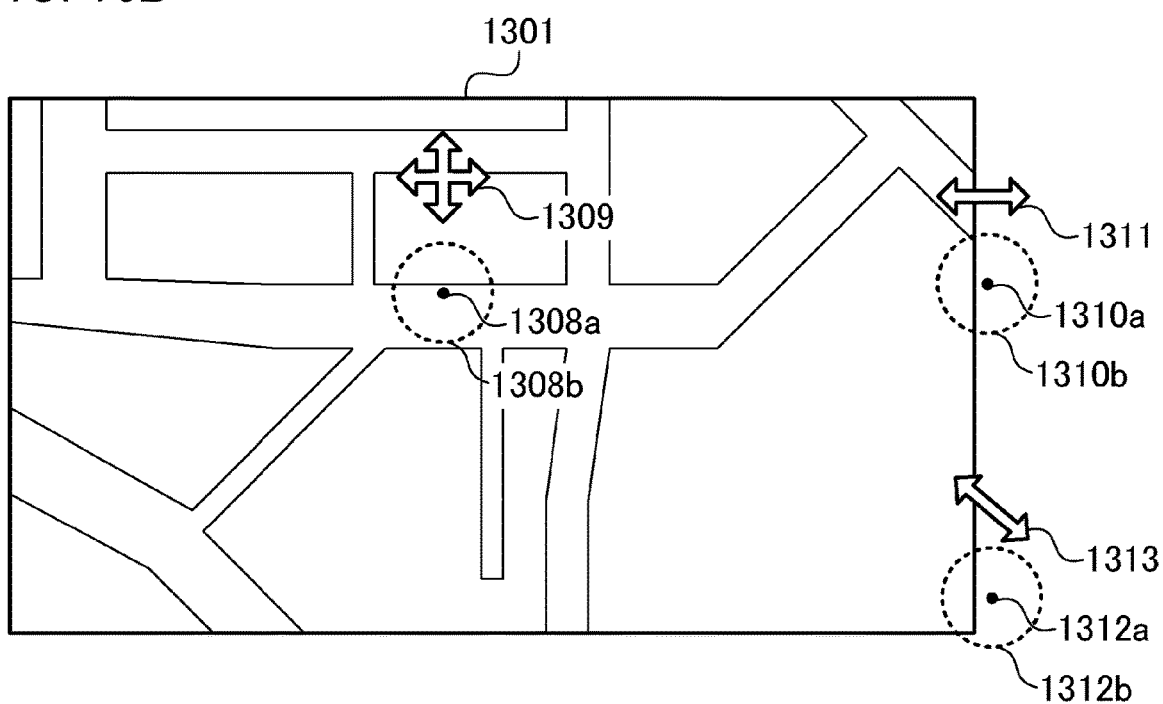

A specific example of the notification image (notification pointer) will be described with reference to FIGS. 13A and 13B. In FIGS. 13A and 13B, a window 1301 is a window that displays a map. First, FIG. 13A will be described. FIG. 13A illustrates an example in a case where a drag operation is performed with a weak touch pressure (a normal touch pressure).

In FIG. 13A, in a case where a drag operation of which the touch position starts from a position 1302a is performed, first, a determination area 1302b is set. Since an edge of the window 1301 is not included in the determination area 1302b, the processes of S1217 and S1218 in FIG. 12 are performed. The determination area 1302b is an area inside the window 1301. Thus, for example, by the display control of S1217, a notification pointer 1303 indicating a scroll process of scrolling a map is displayed. Moreover, in S1218, a scroll process of scrolling a map is performed according to movement of a touch position.

In FIG. 13A, in a case where a drag operation of which the touch position starts from a position 1304a is performed, first, a determination area 1304b is set. Since an edge of the window 1301 is included in the determination area 1304b, the processes of S1215 and S1216 in FIG. 12 are performed. In the determination area 1304b, the right side of the window 1301 only is included as the edge. Thus, for example, by the display control in S1215, a notification pointer 1305 indicating a window size changing process of changing a horizontal size (width) of the window 1301 is displayed. Moreover, in S1216, a window size changing process of changing the horizontal size of the window 1301 by moving the horizontal position (the position in the horizontal direction) of the right side of the window 1301 according to movement of the touch position is performed.

In FIG. 13A, in a case where a drag operation of which the touch position starts from a position 1306a is performed, first, a determination area 1306b is set. In the determination area 1306b, the right side of the window 1301 only is included as an edge of the window 1301. Thus, by the display control of S1215, the same notification pointer 1307 as the notification pointer 1305 is displayed. Moreover, in S1216, a window size changing process of changing the horizontal size of the window 1301 is performed.

Next, FIG. 13B will be described. FIG. 13B illustrates an example in a case where a drag operation is performed with a strong touch pressure.

In FIG. 13B, in a case where a drag operation of which the touch position starts from a position 1308a is performed, first, a determination area 1308*b* is set. Although the position 1308*a* is the same position as the position 1302*a* in FIG. 13A, since the touch pressure is stronger, the determination area 1308*b* is larger than the determination area 1302*b* in FIG. 13A. The determination area 1308*b* is an area that does not include an edge of the window 1301 and is an area inside the window 1301. Thus, by the display control of S1217, the same notification pointer 1309 as the notification pointer 1303 is displayed. In S1218, the scroll process is performed.

In FIG. 13B, in a case where a drag operation of which the touch position starts from a position 1310*a* is performed, first, a determination area 1310*b* is set. Although the position 1310*a* is the same position as the position 1304*a* in FIG. 13A, since the touch pressure is stronger, the determination area 1310*b* is larger than the determination area 1304*b* in FIG. 13A. The determination area 1310*b* includes the right side of the window 1301 only as an edge of the window 1301. Thus, by the display control in S1215, the same notification pointer 1311 as the notification pointers 1305 and 1307 is displayed. In S1216, a window size changing process of changing the horizontal size of the window 1301 is performed.

In FIG. 13B, in a case where a drag operation of which the touch position starts from a position 1312*a* is performed, first, a determination area 1312*b* is set. Although the position 1312*a* is the same as the position 1306*a* in FIG. 13A, since the touch pressure is stronger, the determination area 1312*b* is larger than the determination area 1306*b* in FIG. 13A. The determination area 1312*b* includes the right side, the lower side, and the bottom-right corner of the window 1301 as an edge of the window 1301. In this case, for example, the control unit 101 executes a process corresponding to the drag operation on the corner of the window 1301 more preferentially than a process corresponding to the drag operation on the side of the window 1301. Specifically, in S1215, display control of displaying a notification pointer 1313 indicating a window size changing process capable of changing both the horizontal size (width) and the vertical size (height) of the window 1301 is performed. The notification pointer 1313 can be said to be a "notification pointer indicating a window size changing process of changing the size of the window 1301 by changing the position of the bottom-right corner of the window 1301". In S1216, a window size changing process of changing the size of the window 1301 is performed by moving the position of the bottom-right corner of the window 1301 according to movement of the touch position.

As described above, according to the present embodiment, not only the same process as Embodiment 3 but also display control of displaying the notification image is performed. In this way, the user can easily understand which process will be executed according to a touch operation. As illustrated in FIGS. 13A and 13B, the notification image is preferably displayed at a position away from a touch position. In this way, it is possible to eliminate a problem that the notification image is invisible by being concealed by a finger (the visibility of the notification image is improved).

Embodiments 1 to 4 are examples only, and a configuration obtained by appropriately modifying and changing the configurations of Embodiments 1 to 4 within the spirit of the present invention also falls within the scope of the present invention. A configuration obtained by appropriately combining the configurations of Embodiments 1 to 4 also falls within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-021699, filed on Feb. 8, 2016, which is hereby incorporated by reference herein in its entirety.

What is claimed is:

1. An information processing apparatus comprising:
    a memory; and
    a processor configured to cause the information processing apparatus to execute a process according to a program stored in the memory, the process including:
    performing control so that an image is displayed in a window on a touch screen;
    detecting a touch operation, comprising concurrent touches at multiple positions, to the window on the touch screen;
    acquiring pressure information of the detected touch operation;
    selecting, based on the acquired pressure information, either not the image displayed in the window but the window itself or not the window itself but the image displayed in the window, as a target for a scaling process; and
    executing the scaling process for the selected target, wherein while the touch operation to the window is detected repeatedly, the scaling process is executed for the same target as the target previously selected regardless of newly-acquired pressure information of the detected touch operation which occurs after a prior touch operation has ended.

2. The information processing apparatus according to claim 1, wherein
    the processor further causes the information processing apparatus to compare a magnitude of pressure of the acquired pressure information against a predetermined value, the scaling process is executed based on the comparison result.

3. The information processing apparatus according to claim 1, wherein
the processor provides notification information indicating whether a target of the scaling process is the window itself or the image displayed in the window.

4. The information processing apparatus according to claim 1, wherein
the pressure information is based on an output signal of a sensor that outputs an electrical signal based on pressure applied to the touch screen by the touch operation.

5. The information processing apparatus according to claim 1, wherein
the pressure information is based on a size of an area touched in the touch operation.

6. The information processing apparatus according to claim 1, wherein
the pressure information indicates a variation in the pressure in the touch operation.

7. The information processing apparatus according to claim 1, wherein
an area of the window is an area surrounded by a frame on the touch screen.

8. An information processing method comprising:
performing control so that an image is displayed in a window on a touch screen;
detecting a touch operation, comprising concurrent touches at multiple positions, to the window on the touch screen;
acquiring pressure information of the detected touch operation;
selecting, based on the acquired pressure information, either not the image displayed in the window but the window itself or not the window itself but the image displayed in the window, as a target for a scaling process; and
executing the scaling process for the selected target,
wherein while the touch operation to the window is detected repeatedly, the scaling process is executed for the same target as the target previously selected regardless of newly-acquired pressure information of the detected touch operation which occurs after a prior touch operation has ended.

9. A non-transitory computer readable medium that stores a program, wherein
the program causes a computer to execute:
performing control so that an image is displayed in a window on a touch screen;
detecting a touch operation, comprising concurrent touches at multiple positions, to the window on the touch screen;
acquiring pressure information of the detected touch operation;
selecting, based on the acquired pressure information, either not the image displayed in the window but the window itself or not the window itself but the image displayed in the window, as a target for a scaling process; and
executing the scaling process for the selected target,
wherein while the touch operation to the window is detected repeatedly, the scaling process is executed for the same target as the target previously selected regardless of newly-acquired pressure information of the detected touch operation which occurs after a prior touch operation has ended.

* * * * *